United States Patent
Chen et al.

(10) Patent No.: US 9,716,892 B2
(45) Date of Patent: Jul. 25, 2017

(54) VIDEO PARAMETER SET INCLUDING SESSION NEGOTIATION INFORMATION

(71) Applicant: Qualcomm Incorporated, San Diego, CA (US)

(72) Inventors: Ying Chen, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 13/932,929

(22) Filed: Jul. 1, 2013

(65) Prior Publication Data

US 2014/0003492 A1    Jan. 2, 2014

Related U.S. Application Data

(60) Provisional application No. 61/667,387, filed on Jul. 2, 2012, provisional application No. 61/669,587, filed on Jul. 9, 2012, provisional application No. 61/798,135, filed on Mar. 15, 2013.

(51) Int. Cl.
| | |
|---|---|
| H04N 7/26 | (2006.01) |
| H04N 19/30 | (2014.01) |
| H04N 19/597 | (2014.01) |
| H04N 19/70 | (2014.01) |

(52) U.S. Cl.
CPC ........... *H04N 19/30* (2014.11); *H04N 19/597* (2014.11); *H04N 19/70* (2014.11)

(58) Field of Classification Search
CPC ............. H04N 19/00545; H04N 19/30; H04N 19/597; H04N 19/70
See application file for complete search history.

(56) References Cited

U.S. PATENT DOCUMENTS

| | | |
|---|---|---|
| 6,094,443 A | 7/2000 | Dwork |
| 6,301,428 B1 | 10/2001 | Linzer |
| 6,411,739 B2 | 6/2002 | Boon |
| 6,445,776 B1 | 9/2002 | Shank et al. |
| 6,661,358 B1 | 12/2003 | Hashimoto |
| 7,373,005 B2 | 5/2008 | Venkataraman |

(Continued)

OTHER PUBLICATIONS

Boyce, et al., "High level syntax hooks for future extensions", JCT-VC Meeting; MPEG Meeting; Feb. 1-10, 2012; San Jose; (Joint Collaborative Team on Video Coding of ISO/IEC JTC1/SC29/WG11 and ITU-T SG.16); URL: http:// wftp3. itu.int/av-arch/jctvc-site/, No. JCTVC-H0388, XP030111415, 8 pp.

(Continued)

*Primary Examiner* — Jay Patel
*Assistant Examiner* — Joseph Suh
(74) *Attorney, Agent, or Firm* — Shumaker & Sieffert, P.A.

(57) ABSTRACT

A device for processing video data can be configured to receive in a video parameter set, one or more syntax elements that include information related to session negotiation; receive in the video data a first sequence parameter set that includes a first syntax element identifying the video parameter set; receive in the video data a second sequence parameter set that includes a second syntax element identifying the video parameter set; process, based on the one or more syntax elements, a first set of video blocks associated with the first sequence parameter set and a second set of video blocks associated with the second sequence parameter set.

52 Claims, 13 Drawing Sheets

(56) References Cited

U.S. PATENT DOCUMENTS

| | | | |
|---|---|---|---|
| 8,145,498 | B2 | 3/2012 | Herre et al. |
| 9,479,773 | B2 | 10/2016 | Wang |
| 2001/0031008 | A1 | 10/2001 | Segawa et al. |
| 2001/0043654 | A1* | 11/2001 | Yamazaki ............... H04N 19/61 375/240.25 |
| 2001/0053182 | A1* | 12/2001 | Ishiyama ............. H04N 19/172 375/240.05 |
| 2003/0177503 | A1 | 9/2003 | Sull et al. |
| 2004/0261104 | A1* | 12/2004 | Gordon ................ H04N 5/4401 725/39 |
| 2005/0069039 | A1 | 3/2005 | Crinon |
| 2005/0179568 | A1 | 8/2005 | Wee et al. |
| 2005/0254575 | A1 | 11/2005 | Hannuksela et al. |
| 2006/0039480 | A1* | 2/2006 | Seo ................. H04N 21/234318 375/240.24 |
| 2006/0059426 | A1* | 3/2006 | Ogikubo .............. G11B 27/034 715/723 |
| 2006/0098001 | A1 | 5/2006 | Lai |
| 2006/0126660 | A1 | 6/2006 | Denney et al. |
| 2006/0233247 | A1* | 10/2006 | Visharam ........... G11B 27/3027 375/240.12 |
| 2006/0239563 | A1* | 10/2006 | Chebil ............. G11B 20/10527 382/232 |
| 2006/0242310 | A1* | 10/2006 | Quah .................. H04L 65/1016 709/229 |
| 2006/0256851 | A1* | 11/2006 | Wang ............. H04N 21/234327 375/240.01 |
| 2006/0268166 | A1 | 11/2006 | Bossen et al. |
| 2007/0171903 | A1* | 7/2007 | Zeng ................. H04L 29/06027 370/389 |
| 2007/0177671 | A1* | 8/2007 | Yang .................... H04N 19/597 375/240.25 |
| 2007/0219808 | A1 | 9/2007 | Herre et al. |
| 2007/0291836 | A1* | 12/2007 | Shi ................. H04N 21/234381 375/240.01 |
| 2008/0144723 | A1* | 6/2008 | Chen ...................... H04N 19/15 375/240.26 |
| 2008/0253467 | A1 | 10/2008 | Wang et al. |
| 2009/0022230 | A1* | 1/2009 | Kirenko ................. H04N 19/61 375/240.26 |
| 2010/0091841 | A1* | 4/2010 | Ishtiaq ................ H04N 19/147 375/240.02 |
| 2010/0095186 | A1 | 4/2010 | Weingarten |
| 2010/0153395 | A1* | 6/2010 | Hannuksela et al. G11B 27/102 707/737 |
| 2011/0096826 | A1 | 4/2011 | Han et al. |
| 2011/0150351 | A1 | 6/2011 | Singh et al. |
| 2012/0063515 | A1 | 3/2012 | Panchal et al. |
| 2012/0124633 | A1 | 5/2012 | Lu et al. |
| 2012/0183076 | A1 | 7/2012 | Boyce et al. |
| 2012/0236111 | A1 | 9/2012 | Halavy et al. |
| 2013/0094773 | A1 | 4/2013 | Misra et al. |
| 2013/0182755 | A1 | 7/2013 | Chen et al. |
| 2014/0003491 | A1 | 1/2014 | Chen et al. |
| 2014/0003493 | A1 | 1/2014 | Chen et al. |
| 2014/0301441 | A1 | 10/2014 | Wang et al. |
| 2014/0301469 | A1 | 10/2014 | Wang et al. |
| 2014/0301483 | A1 | 10/2014 | Wang et al. |
| 2014/0301484 | A1 | 10/2014 | Wang et al. |
| 2014/0307803 | A1 | 10/2014 | Wang et al. |

OTHER PUBLICATIONS

Boyce, et al., "NAL unit header and parameter Set designs for HEVC extensions", JCT-VC Meeting; MPEG Meeting; Oct. 10-19, 2012; Shanghai; (Joint Collaborative Team on Video Coding of ISO/IEC JTC1/SC29/WG11 and ITU-T SG.16); URL: http://wftp3.itu.int/av-arch/jctvc-site/,, No. JCTVC-K1007, XP030113273, 8 pp.

Chen, et al., "SHVC Working Draft 1", JCT-VC Meeting; MPEG Meeting; Jan. 14-23, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-L1008, XP030113953, 33 pp.

Chen Y., et al., "AHG10: On video parameter set for HEVC extensions," 10. JCT-VC Meeting; 101. MPEG Meeting; Jul. 11-20, 2012; Stockholm; (Joint Collaborative Team on Video Coding of ISO/IEC JTC1/SC29/WG11 and ITU-T SG.16); URL: http://wftp3.itu.int/av-arch/jctvc-site/, No. JCTVC-J0124, XP030112486, 15 pp.

Chen, et al., "AHG10: Video parameter set for HEVC base specification", JCT-VC Meeting; MPEG Meeting; Jul. 11-20, 2012; Stockholm; (Joint Collaborative Team on Video Coding of ISO/IEC JTC1/SC29/WG11 and ITU-T SG.16 ); URL: URL: http://wftp3.itu.int/av-arch/jctvc-site/, No. JCTVC-J0114, XP030112476, 15 pp.

Chen, et al., "AHG7: Target output views for MV-HEVC", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16); URL: http://phenix.int-evry.fr/jct2/ No. JCT3V-C0059, XP030130475, 2 pp.

Deshpande, "On Video Signal Information in VPS", JCT-3V Meeting; Oct. 23-Nov. 1, 2013; Geneva; (The Joint Collaborative Team on 3D Video Coding Extension Development of ISO/IEC JTC1/SC29/WG11 and ITU-T SG.16); URL:http://phenix.int-evry.fr/jct2/, No. JCT3V-F0063, XP030131470, 6 pp.

Ikai, et al., "AHG7:On VPS extension", 3. JCT-3V Meeting; 103. MPEG Meeting; Jan. 17-23, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-C0086, XP030130502, 6 pp.

ITU-T H.264, Series H: Audiovisual and Multimedia Systems, Infrastructure of audiovisual services—Coding of moving video, Advanced video coding for generic audiovisual services, Mar. 2005, 343 pp.

"ITU-T H.265, Series H: Audiovisual and Multimedia Systems, Infrastructure of audiovisual services—Coding of moving video, High efficiency video coding, The International Telecommunication Union, Oct. 2014, 540 pp.".

Rusert, "On VPS extension design", JCT-VC Meeting; MPEG Meeting; Jan. 14-23, 2013; Geneva; (Joint Collaborative Team on Video Coding of ISO/IEC JTC1/SC29/WG11 and ITU-T SG.16 ); URL: http://wftp3.itu.int/av-arch/jctvc-site/,,No. JCTVC-L0138, XP030113626, 7 pp.

Skupin, et al., "3D-HLS: Design of the Video Parameter Set for 3D-HEVC", JCT-3V Meeting; MPEG Meeting; Jul. 16-20, 2012; Stockholm; (The Joint Collaborative Team on 3D Video Coding Extension Development of ISO/IEC JTC1/SC29/WG11 and ITU-T SG.16); URL: http://phenix.int-evry.fr/jct2/, No. JCT3V-A0121, XP030130120, 10 pp.

Skupin, et al., "AHG9/AHG10: Design of the Video Parameter Set", 10. JCT-VC Meeting; 101. MPEG Meeting; Jul. 11-20, 2012; Stockholm; (Joint Collaborative Team on Video Cooing of ISO/IEC JTC1/SC29/WG11 and ITU-T SG.16); URL: http://wftp3.itujnt/av-arch/jctvc-site/, No. JCTVC-J0257, XP030112619, 9 pp.

Tech, et al., "MV-HEVC Draft Text 3", JCT-3V Meeting; MPEG Meeting, Jan. 17-23, 2013, Geneva, (The Joint Collaborative Team on 3D Video Coding Extension Development of ISO/IEC JTC1/SC29/WG11 and ITU-T SG.16 ), URL: http://phenix.int-evry.fr/jct2/ No. JCT3V-C1004_d0, XP030130663, 27 pp.

Wang, et al., "AHG9: VPS and SPS designs in HEVC 3DV and scalable extensions", JCT-VC Meeting; MPEG Meeting; Apr. 18-26, 2013; Incheon; (Joint Collaborative Team on Video Coding of ISO/IEC JTC1/SC29/WG11 and ITU-T SG.16); URL: http://wftp3.itu.int/av-arch/jctvc-site/, No. JCTVC-M0268, XP030114225, 22 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Second Written Opinion from International Application No. PCT/US2013/049123, dated Jun. 5, 2014, 5 pp.

Boyce, et al., "SEI message for sub-bitstream profile & level indicators", JCT-VC Meeting; MPEG Meeting; Apr. 27, 2012-Jul. 5, 2012; Genev.(Joint Collaborative Team on Video Coding of ISO/IEC JTC1/SC29/WG11 and ITU-T SG.16 ); URL: http://wftp3 .itu .i nt/ a v -arch/jctvc-site/, No. JCTVC-I0231, XP030111994, 7 pp.

(56) References Cited

OTHER PUBLICATIONS

Bross B., et al., "Editors' Proposed Corrections to HEVC version 1," Joint Collaborative Team on Video Coding (JCT VC) of ITU-T SG16 WP3 and ISO/IEC JTC1/SC29/WG11, 13th Meeting, Incheon, KR, Apr. 2013, which as of Sep. 30, 2013, 310 pp.
Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.
Bross et al., "High Efficiency Video Coding (HEVC) text specification draft 7., Annex E" May 10, 2012, JCT-VC Meeting; MPEG Meeting; Apr. 27, 2012-May 7, 2012; Geneva; (Joint Collaborative Team on Video Coding of ISO/IEC JTC1/SC29/WG11 and ITU-T SG.16) XP882711777, pp. 239-252.
Bross B. et al., "High Efficiency Video Coding (HEVC) Text Specification Draft 7", Draft of HEVC, Joint Collaborative Team on Video Coding (JCT-VC) of ITU-T SG16 WP3 and ISO/IEC JTC1/SC29/WG11, 9th Meeting, Geneva, Apr. 27, 2012-May 7, 2012, JCTVC-I1003_d5, 294 pages [uploaded in parts].
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross, et al., "High Efficiency Video Coding (HEVC) Text Specification Draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, Document: JCTVC_K1003_v10, 306 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d4, 297 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," JCTVC-F803_d1, ISO/IEC/ITU-T Joint Collaborative Team on Video Coding, Turin, Italy (Jul. 2011), 222 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Chen, et al., "3D-HLS: Video parameter set for 3D-HEVC", JCT-3V Meeting; MPEG Meeting; Jul. 16, 2012-Jul. 20, 2012; Stockholm; (The Joint Collaborative Team on 3D Video Coding Extension Development of ISO/IEC JTC1/SC29/WG11 and ITU-T SG.16); URL: http://phenix.int-evry.fr/jct2/,No. JCT3V-A0099, 15 pp.
Chen, et al., "AHG12: Video parameter set and its use in 3D-HEVC ", JCT-VC Meeting; MPEG Meeting; Apr. 27, 2012-Jul. 5, 2012; Geneva; (Joint Collaborative Team on Video Coding of ISO/IEC JTC1/SC29/WG11 and ITU-T SG.16 ); URL: http://wftp3.itu.intiav-arch/jctvc-site/, No. JCTVC-I0571, 9 pp.
Tsai, et al., "Non-CE8: Pure VLC for SAO and ALF", JCT-VC Meeting; MPEG Meeting; Nov. 21, 2011-Nov. 30, 2011;.Geneva; (Joint Collaborative Team on Video Coding of ISO/IEC JTC1/SC29/WG11 and ITU-T SG.16); URL: http:// wftp3.1tu.int/av-arch/jctvc-site/, No. JCTVC-G220, XP030110204, 5 pp.
International Preliminary Report on Patentability from International Application number PCT/US2013/049123—dated Aug. 14, 2014, 10 pp.

International Search Report and Written Opinion from International Application No. PCT/US2013/049123 dated Sep. 11, 2013, 13 pp.
ITU-T H.264, Series H: Audiovisual and Multimedia Systems, Infrastructure of audiovisual services—Coding of moving video, Advanced video coding for generic audiovisual services, Mar. 2010, 674 pp.
ITU-T H.265, Series H: Audiovisual and Multimedia Systems, Infrastructure of audiovisual services—Coding of moving video, High efficiency video coding, The International Telecommunication Union, Apr. 2013, 317 pages.
Schierl, et al., "System Layer Integration of High Efficiency Video Coding," IEEE Transactions on Circuits and Systems for Video Technology, vol. 22 (12), Dec. 2012, pp. 1871-1884.
Singer, "HEVC Profile Signalling", JCT-VC Meeting; MPEG Meeting; Apr. 27, 2012-Jul. 5, 2012; Geneva; (Joint Collaborative Team on Video Coding of ISO/IEC JTC/ISC29/WG11 and ITU-T SG.16 ); URL: http://wftp3 .itu .i nt/ a v -arc h/jctvc-s ite/, No. JCTVC-10499, 5 pp.
Sjoberg, et al "Overview of HEVC High-Level Syntax and Reference Picture Management," IEEE Transactions on Circuits and Systems for Video Technology, vol. 22 (12), XP011487804, Dec. 2012, pp. 1858-1870.
Skupin, et al.,"Generic HEVC high level syntax for scalability and adaptation", JCT-VC Meeting; MPEG Meeting; Apr. 27, 2012-Jul. 5, 2012; Geneva; (Joint Collaborative Team on Video Coding of ISO/IEC JTC1/SC29/WG11 and ITU-TSG.16 ); URL: http:// wftp3.itu.int/av-arch/jctvc-site/, No. JCTVC-10217, XP030111980, 6 pp.
Song, et al., "Comments on view dependency info", JVT Meeting; MPEG Meeting; Apr. 21, 2007-Apr. 27, 2007; San Josa CR ,US; (Joint Video Team of ISO/IEC JTC1/SC29/WG11 and ITU-T SG.16 ),, No. JVT-W074, XP030007034, 11 pp.
Wang, et al., "MVC HRD and bitstream restriction", JVT Meeting; Jun. 4, 2008-Oct. 4, 2008; Geneva, ; (Joint Video Team OFISO/IEC JTC1/SC29/WG11 and ITU-T SG.16 ), No. JVT-AA020, XP030007363, 19 pp.
Wang, et al., "HRD parameters in VPS", JCT-VC Meeting; MPEG Meeting; Nov. 7, 2012-Jul. 20, 2012; Stockholm; (Joint Collaborative Team on Video Coding of ISO/IEC JTC1/SC29/WG11 and ITU-T SG.16 ); URL: http://wftp3 .itu .i nt i a v -arch/jctvc-site/, No. JCTVC-J0562, 10 pp.
Wenger et al., "Adaptation Parameter Set (APS)", MPEG Meeting; Jul. 18, 2011-Jul. 22, 2011; Torino; (Motion Picture Expert Group or ISO/IEC JTC1 /SC29/WG11), No. m21385, XP030049948, 10 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Zhu, et al., "SVC hypothetical reference decoder," JVT Meeting; MPEG Meeting, Jan. 13, 2007-Jan. 20, 2007, Marrakech, MA; Joint Video Team of ISO/IEC JTC1/SC29/WG11 and ITU-T SG.16, No. JVT-V068, Jan. 21, 2007, 10 pp.
Visharam, et al., "Extensions to the ISO/AVC File Format to Support the Storage of the Scalable Video Coding (SVC) Bit Strems",72, MPEG Meeting; Apr. 18-22, 2005; Busan; (Motion Picture Expert Group or ISO/ IEC JTC1/SC29/WG11), No. M12062, Apr. 29, 2005, XP030040770, ISSN: 0000-0247, 9 pp.
International Preliminary Report on Patentability from International Application No. PCT/US2014/033374, dated Jun. 30, 2015, 9 pp.

\* cited by examiner

VIDEO PARAMETER SET INCLUDING SESSION NEGOTIATION INFORMATION

This application claims the benefit of:
U.S. Provisional Application No. 61/667,387 filed 2 Jul. 2012,
U.S. Provisional Application No. 61/669,587 filed 9 Jul. 2012, and
U.S. Provisional Application No. 61/798,135 filed 15 Mar. 2013,
the entire content of each of which is incorporated by reference herein.

TECHNICAL FIELD

This disclosure relates to the processing of video data and, more particularly, this disclosure describes techniques related to generating and processing parameter sets for video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes design techniques for parameter sets in video coding, and more particularly, this disclosure describes techniques related to video parameter sets (VPSs). VPSs are a syntax structure that may apply to multiple entire video sequences. According to the techniques of this disclosure, a VPS may include syntax elements related to session negotiation.

In one example, a method of processing video data includes receiving in a video parameter set, one or more syntax elements that include information related to session negotiation; receiving in the video data a first sequence parameter set comprising a first syntax element identifying the video parameter set; receiving in the video data a second sequence parameter set comprising a second syntax element identifying the video parameter set; and, processing, based on the one or more syntax elements, a first set of video blocks associated with the first parameter set and a second set of video blocks associated with the second parameter set.

In another example, a method of encoding video data includes generating, for inclusion in a video parameter set, one or more syntax elements that include information related to session negotiation; generating, for inclusion in the video data, a first sequence parameter set comprising a first syntax element identifying the video parameter set; generating, for inclusion in the video data, a second sequence parameter set comprising a second syntax element identifying the video parameter set; encoding, based on the one or more syntax elements, a first set of video blocks associated with the first parameter set and a second set of video blocks associated with the second parameter set.

In another example, a device for processing video data includes a video processing element configured to: receive in a video parameter set, one or more syntax elements that include information related to session negotiation; receive in the video data a first sequence parameter set comprising a first syntax element identifying the video parameter set; receive in the video data a second sequence parameter set comprising a second syntax element identifying the video parameter set; process, based on the one or more syntax elements, a first set of video blocks associated with the first parameter set and a second set of video blocks associated with the second parameter set.

In another example, a device for processing video data includes a video processing element configured to: generate, for inclusion in a video parameter set, one or more syntax elements that include information related to session negotiation; generate, for inclusion in the video data, a first sequence parameter set comprising a first syntax element identifying the video parameter set; generate, for inclusion in the video data, a second sequence parameter set comprising a second syntax element identifying the video parameter set; encode, based on the one or more syntax elements, a first set of video blocks associated with the first parameter set and a second set of video blocks associated with the second parameter set.

In another example, a device for processing video data includes means for receiving in a video parameter set, one or more syntax elements that include information related to session negotiation; means for receiving in the video data a first sequence parameter set comprising a first syntax element identifying the video parameter set; means for receiving in the video data a second sequence parameter set comprising a second syntax element identifying the video parameter set; and, means for processing, based on the one or more syntax elements, a first set of video blocks associated with the first parameter set and a second set of video blocks associated with the second parameter set.

In another example, a computer-readable storage medium stores instructions that when executed cause one or more processors to: receive in a video parameter set, one or more syntax elements that include information related to session negotiation; receive in the video data a first sequence parameter set comprising a first syntax element identifying the video parameter set; receive in the video data a second sequence parameter set comprising a second syntax element identifying the video parameter set; process, based on the one or more syntax elements, a first set of video blocks associated with the first parameter set and a second set of video blocks associated with the second parameter set.

The details of one or more examples are set forth in the accompanying drawings and the description below. Other features, objects, and advantages will be apparent from the description and drawings, and from the claims.

DETAILED DESCRIPTION

Figure 1:
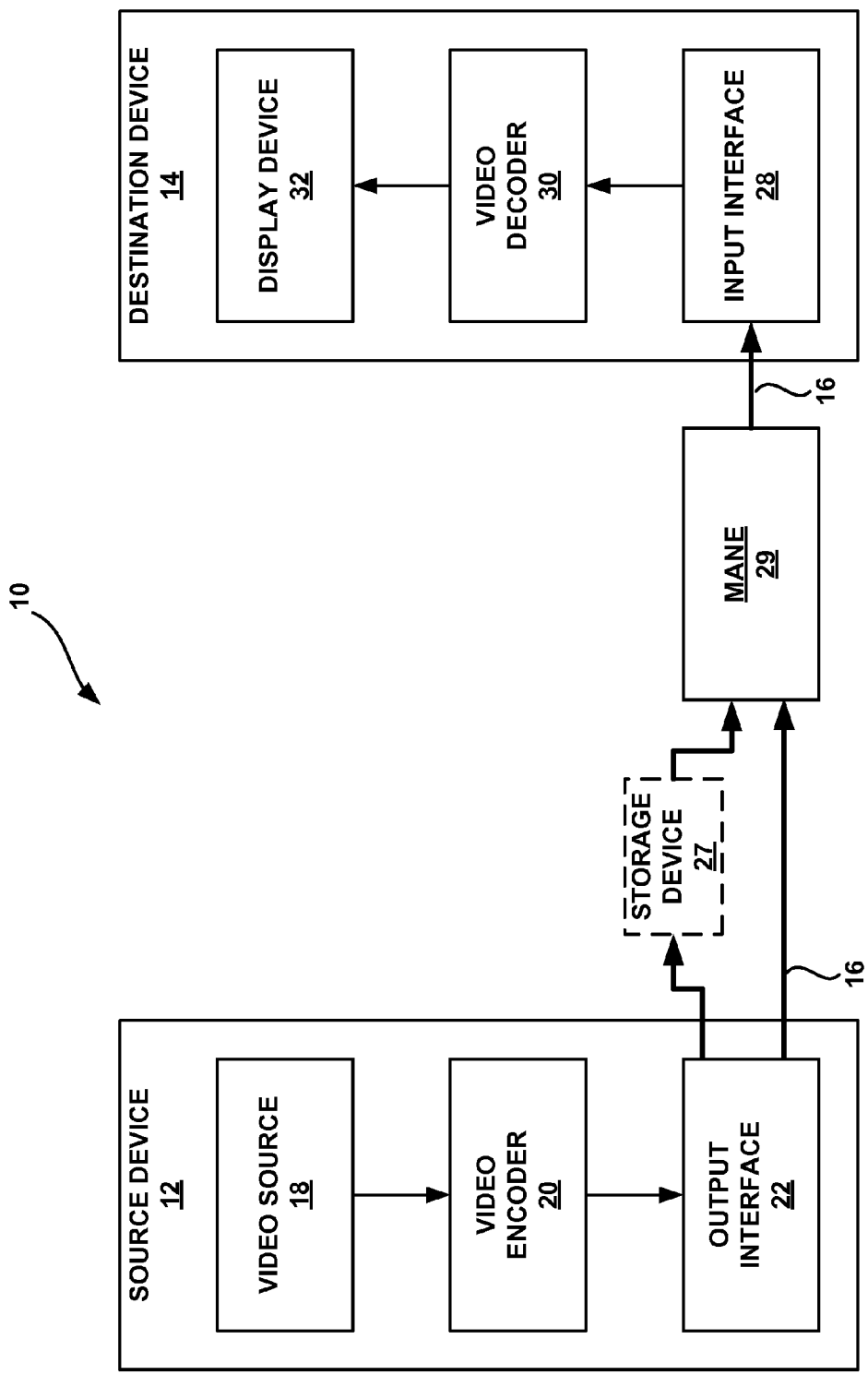
FIG. 1 is a block diagram illustrating an example video encoding and decoding system that may utilize the techniques described in this disclosure.

This disclosure describes design techniques for parameter sets in video coding, and more particularly, this disclosure describes techniques related to video parameter sets (VPSs). In addition to VPSs, other examples of parameter sets include sequence parameter sets (SPSs), picture parameter sets (PPSs), and adaptation parameter sets (APSs), to name a few.

A video encoder encodes video data. The video data may include one or more pictures, where each of the pictures is a still image forming part of a video. When the video encoder encodes the video data, the video encoder generates a bitstream that includes a sequence of bits that form a coded representation of the video data. The bitstream may include coded pictures and associated data, where a coded picture refers to a coded representation of a picture. The associated data may include various types of parameter sets including VPSs, SPSs, PPSs, and APSs, and potentially other syntax structures. SPSs are used to carry data that is valid to a whole video sequence, whereas PPSs carry information valid on a picture-by-picture basis. APSs carry picture-adaptive information that is also valid on a picture-by-picture basis but is expected to change more frequently than the information in the PPS.

HEVC has also introduced the VPS which the HEVC working draft describes as follows:

video parameter set (VPS): A syntax structure containing syntax elements that apply to zero or more entire coded video sequences as determined by the content of a video_parameter_set_id syntax element found in the sequence parameter set referred to by the seq_parameter_set_id syntax element, which is found in the picture parameter set referred to by the pic_parameter_set_id syntax element found in each slice segment header.

Thus, as VPSs apply to entire coded video sequences, the VPS includes syntax elements that change infrequently. The VPS, SPS, PPS, and APS mechanism in some versions of HEVC decouples the transmission of infrequently changing information from the transmission of coded video block data. VPSs, SPSs, PPSs, and APSs may, in some applications, be conveyed "out-of-band" i.e., not transported together with the units containing coded video data. Out-of-band transmission is typically reliable, and may be desirable for improved reliability relative to in-band transmission. In HEVC WD7, an identifier (ID) of a VPS, an SPS, a PPS, or an APS may be coded for each parameter set. Each SPS includes an SPS ID and a VPS ID, each PPS includes a PPS ID and an SPS ID, and each slice header includes a PPS ID and possibly an APS ID. In this way, ID's can be used to identify the proper parameter set to be used in different instances.

As introduced above, video encoders typically encode video data, and decoders typically decode video data. Encoders and decoders, however, are not the only devices used for processing video data. When video is transported, for example as part of a packet-based network such as a local area network, a wide-area network, or a global network such as the Internet, routing devices and other such devices may process the video data in order to deliver it from a source to a destination device. Special routing devices, sometimes called media aware network elements (MANEs), may perform various routing functions based on the content of the video data. To determine the content of the video data and perform these routing functions, the MANE may access information in the encoded bitstream, such as information in the VPS or SPS.

In a parameter set, some syntax elements are coded using a fixed number of bits, while some syntax elements are coded using a variable number of bits. In order to process syntax elements of variable length, a device may require entropy decoding capabilities. Performing entropy decoding, however, may introduce a level of complexity that is undesirable for a MANE or other network elements. According to one technique introduced in this disclosure, an offset syntax element can be included in a parameter set, such as a VPS in order to aid network elements in identifying syntax elements that can be decoded without any entropy decoding. The offset syntax element may be preceded by fixed length syntax elements. The offset syntax element may then identify syntax elements in the parameter set that are to be coded using variable length syntax elements. Using the offset syntax element, a device, such as a MANE, may skip over the variable the length coded syntax elements and resume processing fixed length syntax elements. The offset syntax element may identify the syntax elements to be skipped by identifying a number of bytes within the parameter set that are to be skipped. These skipped bytes may correspond to the skipped syntax elements. As mentioned above, the skipped syntax elements may include variable length coded syntax elements and may also include fixed length coded syntax elements.

In this context, skipping the syntax elements means the MANE may avoid parses or other processing of the syntax elements that are coded with variable lengths. Thus, the MANE can process some syntax elements in the VPS (e.g., fixed length elements) without having to perform entropy decoding, while skipping some syntax elements that may otherwise require entropy decoding. The syntax elements skipped by the MANE are not limited to variable length syntax elements, as some fixed length syntax elements may also be skipped in various examples. A video decoder may be configured to, upon receiving the offset syntax element, essentially ignore one or more of the syntax elements, meaning the video decoder may avoid parsing and processing the syntax elements that were skipped by the MANE.

The use of an offset syntax element may reduce the complexity needed for a MANE to process portions of a parameter set, e.g., by eliminating a need for the MANE to perform entropy decoding. Additionally, the use of an offset syntax element, as proposed in this disclosure, may enable the use of a hierarchical format for parameter sets. As an example of a hierarchical format, in a VPS, instead of having syntax elements for a base layer and an enhancement layer intermixed within the VPS, all or substantially all syntax elements of a base layer may precede all or substantially all syntax elements of a first enhancement layer, which in turn may precede all or substantially all syntax elements for a second enhancement layer, and so on. Using the offset syntax element introduced in this disclosure, a MANE may process a number of fixed length syntax elements for a base layer, skip a number of variable length syntax elements for the base layer, process a number of fixed length syntax elements for a first enhancement layer, skip a number of variable length syntax elements for the first enhancement layer, process a number of fixed length syntax elements for a second enhancement layer, and so on. A video decoder may be configured to parse and process the syntax elements skipped by the MANE.

The use of an offset syntax element may additionally enable future extensions to a video coding standard. For example, even if other types of variable length coded information were added to a bitstream (e.g., according to a future extension to HEVC), the one or more offset syntax elements may be defined to facilitate skipping of such variable length elements. In other words, the one or more offset syntax elements can be used to identify the location of fixed length syntax elements within the bitstream, and the offset syntax elements may be modified to account for the addition of any other elements in the bitstream for which decoding may be avoided, e.g., by a MANE.

This disclosure additionally proposes including syntax elements related to session negotiation in the video parameter set as opposed to in another parameter set, such as an SPS. By including syntax elements related to session negotiation in the VPS, signaling overhead may be able to be reduced especially when the VPS describes information for multiple layers of video as opposed to information only for a single layer. Moreover, this disclosure proposes using fixed length syntax elements for the session negotiation syntax elements, and the fixed length session negotiation syntax elements can be located before any variable length syntax elements. In order to process syntax elements of variable length, a device needs to be able to perform entropy decoding. Performing entropy decoding, however, may introduce a level of complexity that is undesirable for a MANE. Thus, by using fixed length syntax elements that are present in the VPS prior to any variable length syntax elements, a MANE may be able to parse the syntax elements for session negotiation without having to perform entropy decoding.

Table 2 below shows examples of session negotiation-related syntax elements that may be included in the VPS. Examples of information for session negation include information identifying profiles, tiers, and levels. The HEVC working draft describes profiles, tiers, and levels as follows:

A "profile" is a subset of the entire bitstream syntax that is specified by this Recommendation|International Standard. Within the bounds imposed by the syntax of a given profile it is still possible to require a very large variation in the performance of encoders and decoders depending upon the values taken by syntax elements in the bitstream such as the specified size of the decoded pictures. In many applications, it is currently neither practical nor economic to implement a decoder capable of dealing with all hypothetical uses of the syntax within a particular profile.

In order to deal with this problem, "tiers" and "levels" are specified within each profile. A level of a tier is a specified set of constraints imposed on values of the syntax elements in the bitstream. These constraints may be simple limits on values. Alternatively they may take the form of constraints on arithmetic combinations of values (e.g. picture width multiplied by picture height multiplied by number of pictures decoded per second). A level specified for a lower tier is more constrained than a level specified for a higher tier.

During session negotiation between a client and a MANE, a client may inquire about the availability at the MANE of video data coded according to a certain profile, level, and/or tier. The MANE may be able to parse the first portion (i.e. a fixed-length coded portion) of the VPS which includes the profile, level, and tier information. Among the operation points available at the MANE, a proper one can be chosen by the client, and the MANE can forward the corresponding packages to the client after the session is negotiated.

This disclosure additionally proposes including syntax elements for identifying a hypothetical reference decoder (HRD) in the video parameter set as opposed to in another parameter set, such as an SPS. The HRD parameters identify a hypothetical decoder model that specifies constraints on the variability of conforming NAL unit streams or conforming byte streams that an encoding process may produce. Two types of HRD parameter sets (NAL HRD parameters and VCL HRD parameters) may be included in the VPS. NAL HRD parameters pertain to Type II bitstream conformance, while VCL HRD parameters pertain to all bit stream conformance. HEVC currently distinguished between two types of bitstream that are subject to HRD conformance. The first is called a Type I bitstream and refers to a NAL unit stream containing only the VCL NAL units and filler data NAL units for all access units in the bitstream. The second type of bitstream is called a Type II bitstream and contains the VCL NAL units and filler data NAL units for all access units in the bitstream plus other types of additional NAL units.

The techniques of this disclosure can be applied in single-layer coding as well as to scalable and multiview video coding. A layer may, for example, be a spatial scalable layer, a quality scalable layer, a texture view, or a depth view. In HEVC, a layer generally refers to a set of video coding layer (VCL) NAL units, and associated non-VCL NAL units, that all have a particular layer ID value. Layers can be hierarchical in the sense that a first layer may contain a lower layer. A layer set is sometimes used to refer to a set of layers represented within a bitstream created from another bitstream by operation of sub-bitstream extraction process. An operation point generally refers to a bitstream created from another bitstream by operation of the sub-bitstream extraction process with the another bitstream. An operation point may either include all the layers in a layer set or may be a bitstream formed as a subset of the layer set.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. The encoded video data may be routed from source device 12 to destination device 14 by media aware network element (MANE) 29. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

System 10 may operate in accordance with different video coding standards, a proprietary standard, or any other way of multiview coding. For example, video encoder 20 and video decoder 30 may operate according to a video compression standard, such as the include ITU-T H.261, IS0/IEC MPEG-1 Visual, ITU-T H.262 or IS0/IEC MPEG-2 Visual, ITU-T H.263, IS0/IEC MPEG-4 Visual and ITU-T H.264 (also known as IS0/IEC MPEG-4 AVC), including its Scalable Video Coding (SVC) and Multiview Video Coding (MVC) extensions. The recent, publicly available joint draft of the MVC extension is described in "Advanced video coding for generic audiovisual services," ITU-T Recommendation H.264, March 2010. A more recent, publicly available joint draft of the MVC extension is described in "Advanced video coding for generic audiovisual services," ITU-T Recommendation H.264, June 2011. A current joint draft of the MVC extension has been approved as of January 2012.

In addition, there is a new video coding standard, namely High Efficiency Video Coding (HEVC) standard presently under development by the Joint Collaboration Team on Video Coding (JCT-VC) of ITU-T Video Coding Experts Group (VCEG) and IS0/IEC Motion Picture Experts Group (MPEG). A recent Working Draft (WD) of HEVC, and referred to as HEVC WD7 hereinafter, is available, as of 1 Jul. 2013, from http://phenix.int-evry.fr/jct/doc_end_user/documents/9_Geneva/wg11/JCTVC-11003-v6.zip.

Development of the HEVC standard is ongoing, and a newer Working Draft (WD) of HEVC, referred to as HEVC WD9 is available, as of 1 Jul. 2013, from http://phenix.int-evry.fr/jct/doc_end_user/documents/11_Shanghai/wg11/JCTVC-K1003-v10.zip. For purposes of description, video encoder 20 and video decoder 30 are described in context of the HEVC or the H.264 standard and the extensions of such standards. The techniques of this disclosure, however, are not limited to any particular coding standard. Other examples of video compression standards include MPEG-2 and ITU-T H.263. Proprietary coding techniques, such as those referred to as On2 VP6/VP7/VP8, may also implement one or more of the techniques described herein. A newer draft of the upcoming HEVC standard, referred to as "HEVC Working Draft 10" or "HEVC WD10," is described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$^{th}$ Meeting, Incheon, KR, April 2013, which as of 1 Jul. 2013, is available from http://phenix.int-evry.fr/jct/doc_end_user/documents/13_Incheon/wg11/JCTVC-M0432-v3.zip, the entire content of which is hereby incorporated by reference.

The techniques of this disclosure are potentially applicable to several MVC and/or 3D video coding standards, including the HEVC-based 3D-Video coding (3D-HEVC). The techniques of this disclosure may also be applicable to the H.264/3D-AVC and H.264/MVC+D video coding standards, or extensions thereof, as well as other coding standards. The techniques of this disclosure may at times be described with reference to or using terminology of a particular video coding standard; however, such description should not be interpreted to mean that the described techniques are limited only to that particular standard.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Link 16 may include one or more MANEs, such as MANE 29, that route the video data from source device 12 to destination device 14.

Alternatively, encoded data may be output from output interface 22 to a storage device 27. Similarly, encoded data may be accessed from storage device 27 by input interface. Storage device 27 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 27 may correspond to a file server or another intermediate storage device that may hold the encoded video generated by source device 12. Destination device 14 may access stored video data from storage device 27 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 27 may be a streaming transmission, a download transmission, or a combination of both. Video data retrieved from storage device 27 may be routed to destination device 14 using one or more MANEs, such as MANE 29.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. Video encoder 20 may, for example, generate the offset syntax described in this disclosure. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 12. The encoded video data may be transmitted directly to destination device 14 via output interface 22 of source device 20. The encoded video data may also (or alternatively) be stored onto storage device 27 for later access by destination device 14 or other devices, for decoding and/or playback.

Destination device 14 includes an input interface 28, a video decoder 30, and a display device 32. Video decoder 30 may parse the offset syntax element described in this disclosure. As described above, video decoder 30 may in some instances ignore the offset syntax element, thus enabling video decoder 30 to parse syntax elements skipped by a MANE. In some cases, input interface 28 may include a receiver and/or a modem. Input interface 28 of destination device 14 receives the encoded video data over link 16. The encoded video data communicated over link 16, or provided on storage device 27, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

This disclosure describes design methods for parameter sets, including both video parameter sets and sequence parameter sets, which can be applied in single-layer coding as well as scalable and multiview coding in a mutually-compatible manner. Multiview video coding (MVC) is an extension of H.264/AVC. The MVC specification is briefly discussed below.

Figure 2:
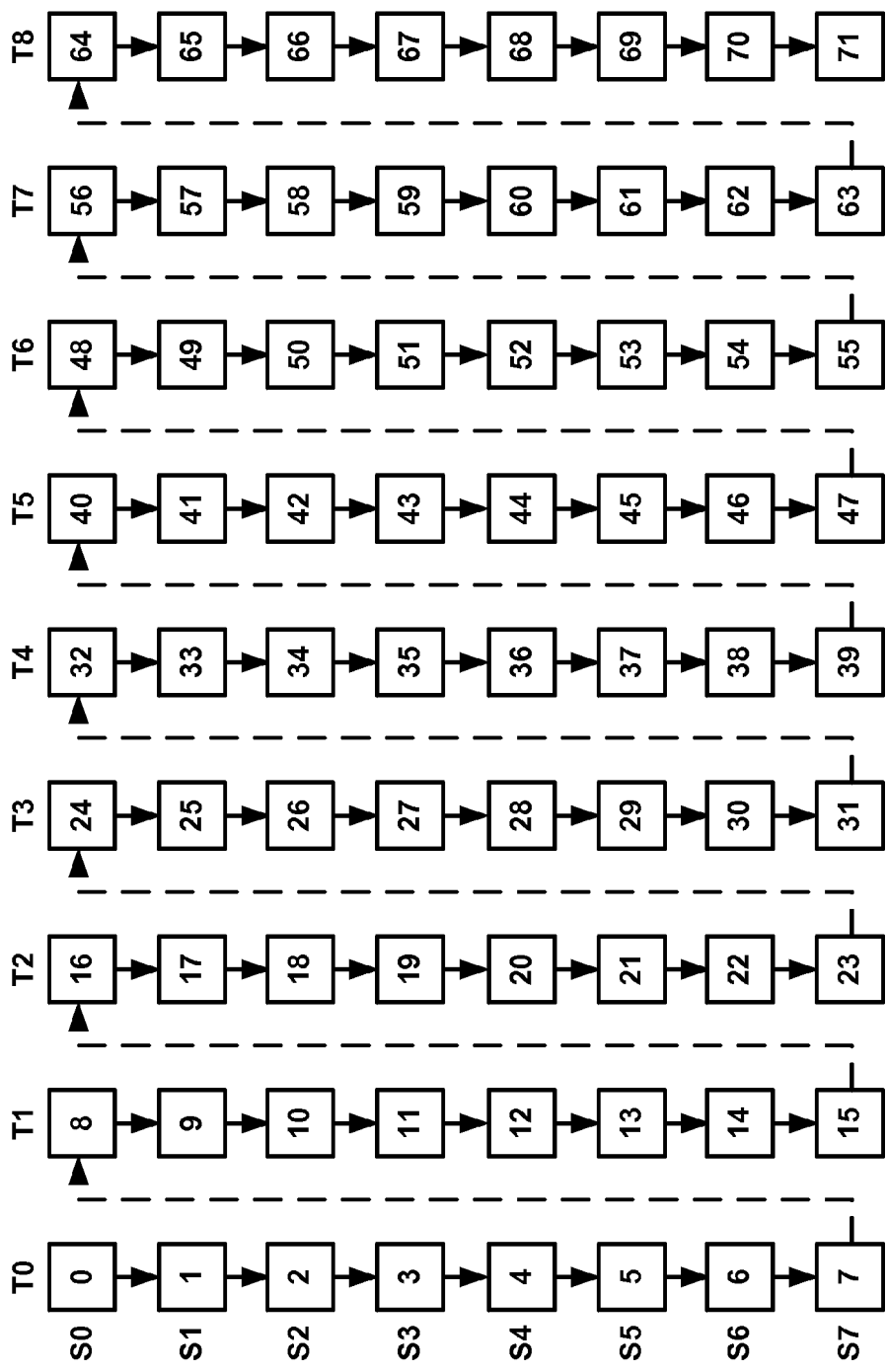
FIG. 2 is a conceptual diagram illustrating an example MVC decoding order.

FIG. 2 is a graphical diagram illustrating an example MVC encoding or decoding order, in accordance with one or more examples described in this disclosure. For example, the decoding order arrangement illustrated in FIG. 2 is referred to as time-first coding. In FIG. 2, S0-S7 each refers to different views of the multiview video. T0-T8 each represents one output time instance. An access unit may include the coded pictures of all the views for one output time instance. For example, a first access unit includes all of the views S0-S7 for time instance T0 (i.e., pictures 0-7), a second access unit includes all of the views S0-S7 for time instance T1 (i.e. pictures 8-15), and so forth. In this examples, pictures 0-7 are at a same time instance (i.e., time instance T0), pictures 8-15 at a same time instance (i.e., time instance T1). Pictures with the same time instance are generally displayed at the same time, and it is the horizontal disparity, and possibly some vertical disparity, between the objects within the pictures of the same time instance that cause the viewer to perceive an image that encompasses a 3D volume.

In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view can be considered as corresponding to the depth view component within the set of the pictures of the view, and vice-versa (i.e., the depth view component corresponds to its texture view component in the set, and vice-versa). As used in this disclosure, a texture view component and a depth view component that correspond may be considered to be part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example, the depth view component may be similar to a gray scale image that includes only luma values. In other words, the depth view component may not convey any image content, but rather provide a measure of the relative depths of the pixels in the texture view component.

For example, a pixel value corresponding to a purely white pixel in the depth view component may indicate that its corresponding pixel or pixels in the corresponding texture view component is closer from the perspective of the viewer, and a pixel value corresponding to a purely black pixel in the depth view component may indicate that its corresponding pixel or pixels in the corresponding texture view component is further away from the perspective of the viewer. The pixel values corresponding to the various shades of gray in between black and white indicate different depth levels. For instance, a very gray pixel in the depth view component indicates that its corresponding pixel in the texture view component is further away than a slightly gray pixel in the depth view component. Because only one pixel value, similar to gray scale, is needed to identify the depth of pixels, the depth view component may include only one pixel value. Thus, values analogous to chroma components are not needed when coding depth.

The depth view component using only luma values (e.g., intensity values) to identify depth is provided for illustration purposes and should not be considered limiting. In other examples, any technique may be utilized to indicate relative depths of the pixels in the texture view component.

In accordance with MVC, the texture view components are inter-predicted from texture view components in the same view or from texture view components in one or more different views. The texture view components may be coded in blocks of video data, which are referred to as "video blocks" and commonly called "macroblocks" in the H.264 context.

In MVC, inter-view prediction is supported by disparity motion compensation, which uses the syntax of the H.264/AVC motion compensation, but allows a picture in a different view to be used as a reference picture for predicting a picture being coded. The coding of two views can also be supported by MVC. One potential advantage of MVC is that an MVC encoder can take more than two views as a 3D video input, and an MVC decoder can decode such a multiview representation of the captured video. Any renderer with an MVC decoder may process 3D video contents with more than two views.

In MVC, inter-view prediction is allowed between pictures in the same access unit (i.e., with the same time instance). When coding a picture in a non-base view, a picture may be added into a reference picture list if the picture is in a different view but with a same time instance. An inter-view prediction reference picture can be put in any position of a reference picture list, just like any inter prediction reference picture.

Figure 3:
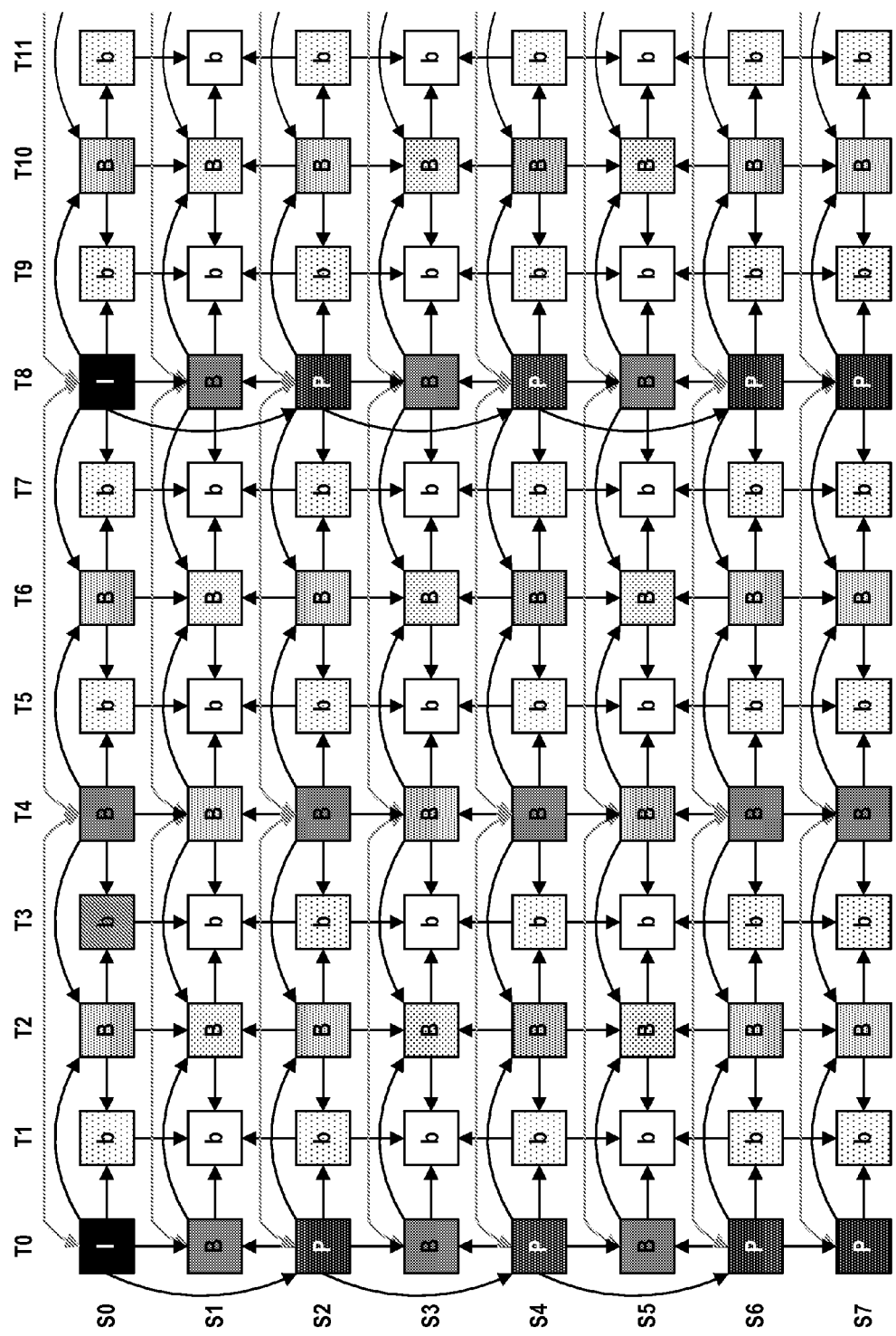
FIG. 3 is a conceptual diagram showing an example MVC temporal and inter-view prediction structure.

FIG. 3 is a conceptual diagram illustrating an example MVC prediction pattern. In the example of FIG. 3, eight views (having view IDs "S0" through "S7") are illustrated, and twelve temporal locations ("T0" through "T11") are illustrated for each view. That is, each row in FIG. 3 corresponds to a view, while each column indicates a temporal location. In the example of FIG. 3, capital "B" and lowercase "b" are used to indicate different hierarchical relationships between pictures, rather than different coding methodologies. In general, capital "B" pictures are relatively higher in the prediction hierarchy than lowercase "b" frames.

In FIG. 3, view S0 may be considered as a base view, and views S1-S7 may be considered as dependent views. A base view includes pictures that are not inter-view predicted.

Picture in a base view can be inter-predicted with respect to other pictures in the same view. For instance, none of the pictures in view S0 can be inter-predicted with respect to a picture in any of views S1-S7, but some of the pictures in view S0 can be inter-predicted with respect to other pictures in view S0.

A dependent view includes pictures that are inter-view predicted. For example, each one of views S1-S7 includes at least one picture that is inter-predicted with respect to a picture in another view. Pictures in a dependent view may be inter-predicted with respect to pictures in the base view, or may be inter-predicted with respect to pictures in other dependent views.

A video stream that includes both a base view and one or more dependent views may be decodable by different types of video decoders. For example, one basic type of video decoder may be configured to decode only the base view. In addition, another type of video decoder may be configured to decode each of views S0-S7. A decoder that is configured to decode both the base view and the dependent views may be referred to as a decoder that supports multiview coding.

Pictures in FIG. 3 are indicated at the intersection of each row and each column in FIG. 3. The H.264/AVC standard with MVC extensions may use the term frame to represent a portion of the video, while HEVC standard may use the term picture to represent a portion of the video. This disclosure uses the term picture and frame interchangeably.

The pictures in FIG. 3 are illustrated using a shaded block including a letter that designates whether the corresponding picture is intra-coded (that is, an I-picture), inter-coded in one direction (that is, as a P-picture), or inter-coded in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video encoding, pictures of a multiview video coding video sequence may be predictively encoded with respect to pictures at different temporal locations. For example, the B-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component (e.g., a texture view component) can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

FIG. 3 provides various examples of inter-view prediction. Pictures of view S1, in the example of FIG. 3, are illustrated as being predicted from pictures at different temporal locations of view S1, as well as inter-view predicted from pictures of views S0 and S2 at the same temporal locations. For example, the B-picture of view S1 at temporal location T1 is predicted from each of the B-pictures of view S1 at temporal locations T0 and T2, as well as the B-pictures of views S0 and S2 at temporal location T1.

FIG. 3 also illustrates variations in the prediction hierarchy using different levels of shading, where a greater amount of shading (that is, relatively darker) frames are higher in the prediction hierarchy than those frames having less shading (that is, relatively lighter). For example, all I-pictures in FIG. 3 are illustrated with full shading, while P-pictures have a somewhat lighter shading, and B-pictures (and lowercase b-pictures) have various levels of shading relative to each other, but always lighter than the shading of the P-pictures and the I-pictures.

In general, the prediction hierarchy may be related to view order indexes, in that pictures relatively higher in the prediction hierarchy should be decoded before decoding pictures that are relatively lower in the hierarchy. Those pictures relatively higher in the hierarchy can be used as reference pictures during decoding of the pictures relatively lower in the hierarchy. A view order index is an index that indicates the decoding order of view components in an access unit. The view order indices are implied in the sequence parameter set (SPS) MVC extension, as specified in Annex H of H.264/AVC (the MVC amendment). In the SPS, for each index i, the corresponding view_id is signaled. The decoding of the view components may follow the ascending order of the view order index. If all the views are presented, then the view order indexes are in a consecutive order from 0 to num_views_minus_1.

In this manner, pictures used as reference pictures are decoded before pictures that depend on the reference pictures. A view order index is an index that indicates the decoding order of view components in an access unit. For each view order index i, the corresponding view_id is signaled. The decoding of the view components follows the ascending order of the view order indexes. If all the views are presented, then the set of view order indexes may comprise a consecutively ordered set from zero to one less than the full number of views.

For certain pictures at equal levels of the hierarchy, the decoding order may not matter relative to each other. For example, the I-picture of view S0 at temporal location T0 may be used as a reference picture for the P-picture of view S2 at temporal location T0, which, in turn, may be used as a reference picture for the P-picture of view S4 at temporal location T0. Accordingly, the I-picture of view S0 at temporal location T0 should be decoded before the P-picture of view S2 at temporal location T0, which in turn, should be decoded before the P-picture of view S4 at temporal location T0. However, between views S1 and S3, a decoding order does not matter, because views S1 and S3 do not rely on each other for prediction. Instead views S1 and S3 are predicted only from other views that are higher in the prediction hierarchy. Moreover, view S1 may be decoded before view S4, so long as view 51 is decoded after views S0 and S2.

In this manner, a hierarchical ordering may be used to describe views S0 through S7. In this disclosure, the notation "SA>SB" means that view SA should be decoded before view SB. Using this notation, S0>S2>S4>S6>S7, in the example of FIG. 2. Also, with respect to the example of FIG. 2, S0>S1, S2>S1, S2>S3, S4>S3, S4>S5, and S6>S5. Any decoding order for the views that does not violate this hierarchical ordering is possible. Accordingly, many different decoding orders are possible, with limitations based on the hierarchical ordering.

The SPS MVC Extension will now be described. A view component can use the view components in other views for reference, which is called inter-view prediction. In MVC, inter-view prediction is realized as if the view component in another view was an inter prediction reference. The potential inter-view references, however are signaled in the Sequence Parameter Set (SPS) MVC extension (as shown in the following syntax table, Table 1) and can be modified by the reference picture list construction process, which enables flexible ordering of the inter prediction or inter-view prediction references. Video encoder 20 represents an ex example of a video encoder configured to generate syntax as shown in Table 1, and video decoder 30 represents an example of a video decoder configured to parse and process such syntax.

TABLE 1

| seq_parameter_set_mvc_extension( ) { | Descriptor |
|---|---|
| num_views_minus1 | ue(v) |
| for( i = 0; i <= num_views_minus1; i++ ) | |
| view_id[ i ] | ue(v) |
| for( i = 1; i <= num_views_minus1; i++ ) { | |
| num_anchor_refs_l0[ i ] | ue(v) |
| for( j = 0; j < num_anchor_refs_l0[ i ]; j++ ) | |
| anchor_ref_l0[ i ][ j ] | ue(v) |
| num_anchor_refs_l1[ i ] | ue(v) |
| for( j = 0; j < num_anchor_refs_l1[ i ]; j++ ) | |
| anchor_ref_l1[ i ][ j ] | ue(v) |
| } | |
| for( i = 1; i <= num_views_minus1; i++ ) { | |
| num_non_anchor_refs_l0[ i ] | ue(v) |
| for( j = 0; j < num_non_anchor_refs_l0[ i ]; j++ ) | |
| non_anchor_ref_l0[ i ][ j ] | ue(v) |
| num_non_anchor_refs_l1[ i ] | ue(v) |
| for( j = 0; j < num_non_anchor_refs_l1[ i ]; j++ ) | |
| non_anchor_ref_l1[ i ][ j ] | ue(v) |
| } | |
| num_level_values_signaled_minus1 | ue(v) |
| for( i = 0; i <= num_level_values_signaled_minus1; i++ ) { | |
| level_idc[ i ] | u(8) |
| num_applicable_ops_minus1[ i ] | ue(v) |
| for( j = 0; j <= num_applicable_ops_minus1[ i ]; j++ ) { | |
| applicable_op_temporal_id[ i ][ j ] | u(3) |
| applicable_op_num_target_views_minus1[ i ][ j ] | ue(v) |
| for( k = 0; k <= applicable_op_num_target_views_minus1[ i ][ j ]; k++ ) | |
| applicable_op_target_view_id[ i ][ j ][ k ] | ue(v) |
| applicable_op_num_views_minus1[ i ][ j ] | ue(v) |
| } | |
| } | |
| } | |

In the SPS MVC extension, for each view, the number of views that can be used to form reference picture list 0 and reference picture list 1 are signaled. A prediction relationship for an anchor picture, as signaled in the SPS MVC extension, can be different from the prediction relationship for a non-anchor picture (signaled in the SPS MVC extension) of the same view.

Parameter sets for HEVC will now be described. In HEVC WD7, the video, sequence, picture and adaptation parameter set mechanism in HEVC decouples the transmission of infrequently changing information from the transmission of coded block data. Video, sequence, picture and adaptation parameter sets may, in some applications, be conveyed "out-of-band," i.e., not transported together with the units containing coded video data. Out-of-band transmission is typically reliable.

In HEVC WD7, an identifier of a video sequence parameter set (VPS), sequence parameter set (SPS), picture parameter set (PPS) or adaptation parameter set (APS) is coded using a variable length syntax element 'ue(v)'. Each SPS includes an SPS ID and a VPS ID, each PPS includes a PPS ID and an SPS ID, and each slice header includes a PPS ID and possibly an APS ID.

Though a video parameter set (VPS) is supported in HEVC WD7, most of the sequence level information parameters are still only present in the SPS. Several problems or potential drawbacks of the VPS design of WD7 exist. As one example, a significant amount of the information contained in SPSs might either be the same for all the SPSs or be the same for at least two SPSs. Duplicating this information in the SPS requires higher bandwidth. The parameter sets (including at least VPS, SPS and PPS) may need to be signaled out-of-band. If signaled in-band, such bit-rate increase is effective to each tune-in at a random access point.

As a second example, in potential HEVC extensions, if similar design principles as AVC are followed, then a majority of the operation point description information may not be included in the SPS or VPS, and instead, SEI messages may be used for session initialization and negotiation. Thus, a MANE may be required to parse SPS, VPS, and SEI messages for the above mentioned purposes. As a third example, some information that is present in the SPS in WD7 may be changed or removed in HEVC extensions.

To address the potential problems discussed above, this disclosure proposes several techniques for the design of parameter sets, including the VPS or other parameter sets. For example, according to the techniques described in this disclosure, information that is typically the same for the whole coded video sequence may be present in the VPS, while only syntax elements that might change in the SPS level may be present in SPS. Other syntax elements may be excluded from the SPS if already present in VPS.

As another example of the techniques of this disclosure, information related to session negotiation may be present in VPS. Examples of information related to session negotiation include profile information, level information, frame resolution information, frame rate information, and bit rate information, as well as other information. As another example of the techniques of this disclosure, the VPS may be designed in a way that the parsing of the operation points information that are important for session negotiation do not require variable length coding, including potentially information for both the base layer or view and for the enhancement layers or views. The syntax elements in VPS may be grouped so that for each group, the HEVC extension might provide zero or more instances, and the operation points in the HEVC extension only refer to an index.

Various examples of the syntax and semantics for VPS, SPS, video usability information (VUI), and HRD parameters and slice header are provided below. Tables 2-6 illustrate a first example. Table 1, set forth above, shows an example of VPS syntax. The "descriptor" columns in Tables 2-6, as well as in the other tables in this disclosure, identify the number of bits for each syntax element, with "v" indicating the number of bits may be variable. Number values in the "descriptor" column indicate the syntax element is conveyed using a fixed number of bits. For example, "u(8)" signifies a syntax element with a fixed number of eight bits, whereas "ue(v)" signifies a syntax element with a variable number of bits. In order to parse syntax elements with the descriptor ue(v), the parsing device (such as a video decoder or MANE) may need to implement entropy coding in order to decode and interpret such syntax elements.

TABLE 2

Video parameter set RBSP syntax

| video_parameter_set_rbsp( ) { | Descriptor |
|---|---|
| vps_max_temporal_layers_minus1 | u(3) |
| vps_max_layers_minus1 | u(5) |
| profile_space | u(3) |

TABLE 2-continued

Video parameter set RBSP syntax

| | Descriptor |
|---|---|
| video_parameter_set_rbsp( ) { | |
|   profile_idc | u(5) |
|   for( j = 0; j < 32; j++ ) | |
|     profile_compatability_flag[ i ] | u(1) |
|   constraint_flags | u(16) |
|   level_idc | u(8) |
|   level_lower_temporal_layers_present_flag | u(1) |
|   if( level_lower_temporal_layers_present_flag ) | |
|     for( i = 0; i < vps_max_temporal_layers_minus1; i++ ) | |
|       level_idc_temporal_subset[ i ] | u(8) |
|   video_parameter_set_id | u(5) |
|   vps_temporal_id_nesting_flag | u(1) |
|   chroma_format_idc | u(2) |
|   if( chroma_format_idc = = 3 ) | |
|     separate_colour_plane_flag | u(1) |
|   bit_depth_luma_minus8 | u(2) |
|   bit_depth_chroma_minus8 | u(2) |
|   pic_width_in_luma_samples | u(16) |
|   pic_height_in_luma_samples | u(16) |
|   for ( i = 0; i <= vps_max_temporal_layers_minus1; i++ ) { | |
|     bitrate_info_present_flag[ i ] | u(1) |
|     frm_rate_info_present_flag[ i ] | u(1) |
|     if( bitrate_info_present_flag[ i ] ) { | |
|       avg_bitrate[ i ] | u(16) |
|       max_bitrate [ i ] | u(16) |
|     } | |
|     if( frm_rate_info_present_flag[ i ] ) { | |
|       constant_frm_rate_idc[ i ] | u(2) |
|       avg_frm_rate[ i ] | u(16) |
|     } | |
|   } | |
|   next_essential_info_byte_offset | u(12) |
|   pic_cropping_flag | u(1) |
|   if( pic_cropping_flag ) { | |
|     pic_crop_left_offset | ue(v) |
|     pic_crop_right_offset | ue(v) |
|     pic_crop_top_offset | ue(v) |
|     pic_crop_bottom_offset | ue(v) |
|   } | |
|   for ( i = 0, nalHrdPresent = 0, vclHrdPresent = 0; i <= vps_max_temporal_layers_minus1; i++ ) { | |
|     nal_hrd_parameters_present_flag[ i ] | u(1) |
|     if( nal_hrd_parameters_present_flag[ i ] ) { | |
|       hrd_parameters( nalHrdPresent ) | |
|       nalHrdPresent++ | |
|     } | |
|     vcl_hrd_parameters_present_flag[ i ] | u(1) |
|     if( vcl_hrd_parameters_present_flag[ i ] ) { | |
|       hrd_parameters( vclHrdPresent ) | |
|       vclHrdPresent++ | |
|     } | |
|     if( nalHrdPresent + vclHrdPresent = = 1 ) { | |
|       low_delay_hrd_flag | u(1) |
|       sub_pic_cpb_params_present_flag | u(1) |
|       num_units_in_sub_tick | u(32) |
|     } | |
|     vps_max_dec_pic_buffering[ i ] | ue(v) |
|     vps_num_reorder_pics[ i ] | ue(v) |
|     vps_max_latency_increase[ i ] | ue(v) |
|   } | |
|   vui_parameters_present_flag | u(1) |
|   if ( vui_parameters_present_flag ) | |
|     vui_parameters( ) | |
|   num_vps_short_term_ref_pic_sets | ue(v) |
|   for( i = 0; i < num_vps_short_term_ref_pic_sets; i++ ) | |
|     short_term_ref_pic_set( i ) | |
|   vps_extension_flag | u(1) |
|   if( vps_extension_flag ) | |
|     while( more_rbsp_data( ) ) | |
|       vps_extension_data_flag | u(1) |
|   rbsp_trailing_bits( ) | |
| } | |

TABLE 3

Sequence parameter set RBSP syntax

| | Descriptor |
|---|---|
| seq_parameter_set_rbsp( ) { | |
|   seq_parameter_set_id | ue(v) |
|   video_parameter_set_id | ue(v) |
|   pcm_enabled_flag | u(1) |
|   if( pcm_enabled_flag ) { | |
|     pcm_sample_bit_depth_luma_minus1 | u(4) |
|     pcm_sample_bit_depth_chroma_minus1 | u(4) |
|   } | |
|   log2_max_pic_order_cnt_lsb_minus4 | ue(v) |
|   restricted_ref_pic_lists_flag | u(1) |
|   if( restricted_ref_pic_lists_flag ) | |
|     lists_modification_present_flag | u(1) |
|   log2_min_coding_block_size_minus3 | ue(v) |
|   log2_diff_max_min_coding_block_size | ue(v) |
|   log2_min_transform_block_size_minus2 | ue(v) |
|   log2_diff_max_min_transform_block_size | ue(v) |
|   if( pcm_enabled_flag ) { | |
|     log2_min_pcm_coding_block_size_minus3 | ue(v) |
|     log2_diff_max_min_pcm_coding_block_size | ue(v) |
|   } | |
|   max_transform_hierarchy_depth_inter | ue(v) |
|   max_transform_hierarchy_depth_intra | ue(v) |
|   scaling_list_enable_flag | u(1) |
|   if( scaling_list_enable_flag ) { | |
|     sps_scaling_list_data_present_flag | u(1) |
|     if( sps_scaling_list_data_present_flag ) | |
|       scaling_list_param( ) | |
|   } | |
|   chroma_pred_from_luma_enabled_flag | u(1) |
|   transform_skip_enabled_flag | u(1) |
|   seq_loop_filter_across_slices_enabled_flag | u(1) |
|   asymmetric_motion_partitions_enabled_flag | u(1) |
|   nsrqt_enabled_flag | u(1) |
|   sample_adaptive_offset_enabled_flag | u(1) |
|   adaptive_loop_filter_enabled_flag | u(1) |
|   if( adaptive_loop_filter_enabled_flag ) | |
|     alf_coef_in_slice_flag | u(1) |
|   if( pcm_enabled_flag ) | |
|     pcm_loop_filter_disable_flag | u(1) |
|   if( log2_min_coding_block_size_minus3 = = 0 ) | |
|     inter_4x4_enabled_flag | u(1) |
|   num_short_term_ref_pic_sets | ue(v) |
|   use_rps_from_vps_flag | u(1) |
|   for( i = 0; i < num_short_term_ref_pic_sets; i++) { | |
|     idx = use_rps_from_vps_flag ? num_vps_short_term_ref_pic_sets + i : i | |
|     short_term_ref_pic_set( idx ) | |
|   } | |
|   long_term_ref_pics_present_flag | u(1) |
|   sps_temporal_mvp_enable_flag | u(1) |
|   tiles_fixed_structure_idc | u(2) |
|   sps_extension_flag | u(1) |
|   if( sps_extension_flag ) | |
|     while( more_rbsp_data( ) ) | |
|       sps_extension_data_flag | u(1) |
|   rbsp_trailing_bits( ) | |
| } | |

TABLE 4

VUI parameters syntax

| | Descriptor |
|---|---|
| vui_parameters( ) { | |
|   aspect_ratio_info_present_flag | u(1) |
|   if( aspect_ratio_info_present_flag ) { | |
|     aspect_ratio_idc | u(8) |
|     if( aspect_ratio_idc = = Extended_SAR ) { | |
|       sar_width | u(16) |
|       sar_height | u(16) |
|     } | |
|   } | |
|   overscan_info_present_flag | u(1) |
|   if( overscan_info_present_flag ) | |

TABLE 4-continued

VUI parameters syntax

| vui_parameters( ) { | Descriptor |
|---|---|
|     overscan_appropriate_flag | u(1) |
|   video_signal_type_present_flag | u(1) |
|   if( video_signal_type_present_flag ) { | |
|     video_format | u(3) |
|     video_full_range_flag | u(1) |
|     colour_description_present_flag | u(1) |
|     if( colour_description_present_flag ) { | |
|       colour_primaries | u(8) |
|       transfer_characteristics | u(8) |
|       matrix_coefficients | u(8) |
|     } | |
|   } | |
|   chroma_loc_info_present_flag | u(1) |
|   if( chroma_loc_info_present_flag ) { | |
|     chroma_sample_loc_type_top_field | ue(v) |
|     chroma_sample_loc_type_bottom_field | ue(v) |
|   } | |
|   neutral_chroma_indication_flag | u(1) |
|   field_seq_flag | u(1) |
|   timing_info_present_flag | u(1) |
|   if( timing_info_present_flag ) { | |
|     num_units_in_tick | u(32) |
|     time_scale | u(32) |
|     fixed_pic_rate_flag | u(1) |
|   } | |
|   bitstream_restriction_flag | u(1) |
|   if( bitstream_restriction_flag ) { | |
|     motion_vectors_over_pic_boundaries_flag | u(1) |
|     max_bytes_per_pic_denom | ue(v) |
|     max_bits_per_mincu_denom | ue(v) |
|     log2_max_mv_length_horizontal | ue(v) |
|     log2_max_mv_length_vertical | ue(v) |
|   } | |
| } | |

TABLE 5

HRD parameters syntax

| hrd_parameters( i ) { | Descriptor |
|---|---|
|   if( i == 0 ) { | |
|     cpb_cnt_minus1 | ue(v) |
|     bit_rate_scale | u(4) |
|     cpb_size_scale | u(4) |
|   } | |
|   for( SchedSelIdx = 0; SchedSelIdx <= cpb_cnt_minus1; SchedSelIdx++ ) { | |
|     bit_rate_value_minus1[ i ][ SchedSelIdx ] | ue(v) |
|     cpb_size_value_minus1[ i ][ SchedSelIdx ] | ue(v) |
|     if( i == 0 ) | |
|       cbr_flag[ SchedSelIdx ] | u(1) |
|   } | |
|   if( i == 0 ) { | |
|     initial_cpb_removal_delay_length_minus1 | u(5) |
|     cpb_removal_delay_length_minus1 | u(5) |
|     dpb_output_delay_length_minus1 | u(5) |
|     time_offset_length | u(5) |
|   } | |
| } | |

TABLE 6

Slice header syntax

| slice_header( ) { | Descriptor |
|---|---|
|   first_slice_in_pic_flag | u(1) |
|   pic_parameter_set_id | ue(v) |
|   if( !first_slice_in_pic_flag ) | |
|     slice_address | u(v) |
|   if( dependent_slice_enabled_flag && !first_slice_in_pic_flag ) | |
|     dependent_slice_flag | u(1) |
|   if( !dependent_slice_flag ) { | |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( RapPicFlag ) { | |
|       rap_pic_id | ue(v) |
|       no_output_of_prior_pics_flag | u(1) |
|     } | |
|     if( !IdrPicFlag ) { | |
|       pic_order_cnt_lsb | u(v) |
|       short_term_ref_pic_set_sps_flag | u(1) |
|       if( !short_term_ref_pic_set_sps_flag ) | |
|         short_term_ref_pic_set( NumShortTermRefPicSets ) | |
|       else | |
|         short_term_ref_pic_set_idx | u(v) |
|       if( long_term_ref_pics_present_flag ) { | |
|         num_long_term_pics | ue(v) |
|         for( i = 0; i < num_long_term_pics; i++ ) { | |
|           poc_lsb_lt[ i ] | u(v) |
|           delta_poc_msb_present_flag[ i ] | u(1) |
|           if( delta_poc_msb_present_flag[ i ] ) | |
|             delta_poc_msb_cycle_lt[ i ] | ue(v) |
|           used_by_curr_pic_lt_flag[ i ] | u(1) |
|         } | |
|       } | |
|     } | |
|     if( sample_adaptive_offset_enabled_flag ) { | |

TABLE 6-continued

| Slice header syntax | |
|---|---|
| slice_header( ) { | Descriptor |
|     slice_sample_adaptive_offset_flag[ 0 ] | u(1) |
|     if( slice_sample_adaptive_offset_flag[ 0 ] ) { | |
|         slice_sample_adaptive_offset_flag[ 1 ] | u(1) |
|         slice_sample_adaptive_offset_flag[ 2 ] | u(1) |
|     } | |
|   } | |
|   if(adaptive_loop_filter_enabled_flag ) | |
|     aps_id | ue(v) |
|   if( slice_type = = P || slice_type = = B ) { | |
|     if( sps_temporal_mvp_enable_flag ) | |
|       pic_temporal_mvp_enable_flag | u(1) |
|     num_ref_idx_active_override_flag | u(1) |
|     if( num_ref_idx_active_override_flag ) { | |
|       num_ref_idx_l0_active_minus1 | ue(v) |
|       if( slice_type = = B ) | |
|         num_ref_idx_l1_active_minus1 | ue(v) |
|     } | |
|   } | |
|   if( lists_modification_present_flag ) | |
|     ref_pic_list_modification( ) | |
|   if( slice_type = = B ) | |
|     mvd_l1_zero_flag | u(1) |
|   if( cabac_init_present_flag && slice_type != I ) | |
|     cabac_init_flag | u(1) |
|   slice_qp_delta | se(v) |
|   if( deblocking_filter_control_present_flag ) { | |
|     if( deblocking_filter_override_enabled_flag ) | |
|       deblocking_filter_override_flag | u(1) |
|     if( deblocking_filter_override_flag ) { | |
|       slice_header_disable_deblocking_filter_flag | u(1) |
|       if( !slice_header_disable_deblocking_filter_flag ) { | |
|         beta_offset_div2 | se(v) |
|         tc_offset_div2 | se(v) |
|       } | |
|     } | |
|   } | |
|   if( pic_temporal_mvp_enable_flag ) { | |
|     if( slice_type = = B ) | |
|       collocated_from_l0_flag | u(1) |
|     if( slice_type != I && | |
|       ((collocated_from_l0_flag &&  num_ref_idx_l0_active_minus1 > 0) || | |
|       (!collocated_from_l0_flag && num_ref_idx_l1_active_minus1 > 0) ) | |
|       collocated_ref_idx | ue(v) |
|   } | |
|   if( ( weighted_pred_flag && slice_type = = P) || | |
|     ( weighted_bipred_idc = = 1 && slice_type = = B ) ) | |
|     pred_weight_table( ) | |
|   if( slice_type = = P || slice_type = = B ) | |
|     five_minus_max_num_merge_cand | ue(v) |
|   if( adaptive_loop_filter_enabled_flag ) { | |
|     slice_adaptive_loop_filter_flag | u(1) |
|     if( slice_adaptive_loop_filter_flag && alf_coef_in_slice_flag ) | |
|       alf_param( ) | |
|     if( slice_adaptive_loop_filter_flag && !alf_coef_in_slice_flag ) | |
|       alf_cu_control_param( ) | |
|   } | |
|   if( seq_loop_filter_across_slices_enabled_flag && | |
|     ( slice_adaptive_loop_filter_flag || slice_sample_adaptive_offset_flag || | |
|     !disable_deblocking_filter_flag ) ) | |
|     slice_loop_filter_across_slices_enabled_flag | u(1) |
| } | |
| if( tiles_or_entropy_coding_sync_idc = = 1 || | |
|     tiles_or_entropy_coding_sync_idc = = 2 ) { | |
|   num_entry_point_offsets | ue(v) |
|   if( num_entry_point_offsets > 0 ) { | |
|     offset_len_minus1 | ue(v) |
|     for( i = 0; i < num_entry_point_offsets; i++ ) | |
|       entry_point_offset[ i ] | u(v) |
|   } | |
| } | |
| if( slice_header_extension_present_flag ) { | |
|   slice_header_extension_length | ue(v) |
|   for( i = 0; i < slice_header_extension_length; i++) | |
|     slice_header_extension_data_byte | u(8) |
| } | |
| byte_alignment( ) | |

TABLE 6-continued

Slice header syntax

| slice_header( ) { | Descriptor |
|---|---|
| } | |

Video parameter set RBSP semantics, such as those shown in Table 2 above, will now be described. The syntax element video_parameter_set_id in Table 2 provides an identification for the video parameter set. Using the value of video_parameter_set_id, another syntax structure, such as an SPS, can activate a particular VPS. Table 3, for example, which shows an example SPS syntax structure, also includes a syntax element video_parameter_set_id. Based on the value of the syntax element video_parameter_set_id in the SPS, a particular VPS with that same value can be activated for coding video blocks associated with the SPS. Typically, multiple SPSs will be associated with the same VPS. As an example, video decoder 30 may receive in the video data a first SPS that includes a first value for the syntax element video_parameter_set_id, and video decoder 30 may also receive a second SPS that includes the same value for the syntax element video_parameter_set_id. The first SPS may be a first syntax structure including a first group of syntax elements that apply to one or more whole pictures of video data, and the second SPS may be a second syntax structure that includes a second group of syntax elements that apply to one or more different whole pictures of video data. Video decoder 30 decodes video blocks associated with both the first SPS and the second SPS based on parameters from the same VPS.

The syntax elements profile_space, profile_idc, profile_compatability_flag[i], constraint_flags, level_idc, bit_depth_luma_minus8, bit_depth_chroma_minus8, chroma_format_idc, pic_width_in_luma_samples, pic_height_in_luma_samples, pic_cropping_flag, pic_crop_left_offset, pic_crop_right_offset, pic_crop_top_offset, pic_crop_bottom_offset, temporal_id_nesting_flag and separate_colour_plane_flag have the same semantics of those syntax elements with the same syntax element names in the sequence parameter set as specified in the WD7 but according to the proposed techniques of this disclosure have been moved from the SPS to the VPS.

The syntax element profile_space identifies a context for interpreting the syntax element profile_idc, and the syntax element profile_idc identifies a group of profiles. The syntax elements profile_compatability_flag[i] may identify if the video data is compatible with profile [i]. Video decoder 30 may, for example, receive in the video data a values for profile_space and profile_idc, and based on the value of profile_space, identify a context for interpreting the syntax element profile_idc. Based on the interpreted value of profile_idc, video decoder 30 can identify a group of profiles, and for each profile, video decoder 30 can receive a value for the syntax element profile_compatability_flag[i] to identify if the video data is compatible with profile [i]. The syntax element profile_idc may, for example, have 32 associated flags, each flag indicating a specific aspect of the profile. For example, a flag may indicate if one particular coding or process tool is turned on or off, given the same profile.

The syntax element level_idc identifies a maximum level associated with the video data, and the syntax element level_lower_temporal_layers_present_flag identifies if a temporal layer of the video data has a level that is lower than the maximum level. The syntax element level_lower_temporal_layers_present_flag set equal to 1 specifies that level_idc_temporal_subset[i] may be present. The syntax element level_lower_temporal_layers_present_flag set equal to 0 specifies that level_idc_temporal_subset[i] is not present. The syntax element level_idc_temporal_subset[i] specifies the level to which the bitstream subset consisting of all NAL units with temporal_id less than or equal to i conforms.

Video decoder 30 may, for example, in response to receiving a syntax element level_lower_temporal_layers_present_flag set equal to 1 receive syntax elements level_idc_temporal_subset[i]. The syntax elements level_idc_temporal_subset[i] may be present to identify a level to which temporal layer [i] complies.

The syntax elements vps_temporal_id_nesting_flag, vps_temporal_id_nesting_flag, vps_max_dec_pic_buffering[i], vps_num_reorder_pics[i], and vps_max_latency_increase[i] have the same semantics of the following syntax elements respectively in the sequence parameter set of the HEVC WD 7: sps_temporal_id_nesting_flag, sps_temporal_id_nesting_flag, sps_max_dec_pic_buffering[i], sps_num_reorder_pics[i], sps_max_latency_increase[i].

The syntax element next_essential_info_byte_offset is an example of the offset syntax element introduced in this disclosure. The syntax element next_essential_info_byte_offset specifies the byte_offset of the next set of profile and level information and other fixed-length coded information in the VPS NAL unit, starting from the beginning of the NAL unit. MANE 29, for example, may receive the syntax element next_essential_info_byte_offset and determine a number of bytes indicated by the syntax element next_essential_info_byte_offset, and based on the determined number of bytes, MANE 29 may skip one or more the variable length coded syntax elements shown in Table 2, such as the variable length syntax elements pic_crop_left_offset, pic_crop_right_offset, pic_crop_top_offset, pic_crop_bottom_offset, and the other variable length syntax elements shown in Table 2. Video decoder 30, however, upon receiving the syntax element next_essential_info_byte_offset may ignore the value of the syntax element. Thus, after parsing the syntax element next_essential_info_byte_offset, video decoder 30 may continue parsing the variable length syntax elements pic_crop_left_offset, pic_crop_right_offset, pic_crop_top_offset, pic_crop_bottom_offset, and the other variable length syntax elements shown in Table 2.

In a future extension of the HEVC specification, for example a scalable coding extension or a 3DV extension, VPS information for a non-base layer or view may be included in the VPS NAL unit after the VPS information for the base layer or view. The VPS information for a non-base layer or view also may start with fixed-length syntax elements, such as coded profile, level, and other information essential for session negotiation. Using the bit offset specified by next_essential_info_byte_offset, MANE 29 may locate and access that essential_information in the VPS NAL unit without the need to perform entropy decoding. Some network entities (e.g. MANE 29) configured to transport and process video data may not be equipped for entropy decoding. Using an offset syntax element as described in this disclosure, however, such network entities can still process some aspects of a parameter set, and use information contained in the processed syntax element when making routing decision for video data. An example of information that a network entity may process when making routing decisions includes information related to session negotiation.

The syntax elements nal_hrd_parameters_present_flag[i] and vcl_hrd_parameters_present_flag[i] have the similar semantic as nal_hrd_parameters_present_flag, and vcl_hrd_parameters_present_flag that are present in VUI parameters of WD7, but are applicable to the i-th temporal layer representation. The syntax element nal_hrd_parameters_present_flag may, for example, signal whether HRD parameters such as bitrate, coded picture buffer (CPB) size, and initial CPB removal delay (initial_cpb_removal_delay_length_minus1), a CPB removal delay (cpb_removal_delay_length_minus1), a DPB output delay (dpb_output_delay_length_minus1), and a time offset length (time_offset_length). The syntax elements may, for example, include a syntax element (cbr flag) indicating if the bit rate for the video date is constant or variable.

The syntax element low_delay_hrd_flag may be used to indicate the removal time of a decoding unit from a DPB. The syntax element sub_pic_cpb_params_present_flag equal to 1 may specify that sub-picture level CPB removal delay parameters are present and the CPB may operate at an access unit level or sub-picture level. The syntax element sub_pic_cpb_params_present_flag equal to 0 may specifies that sub-picture level CPB removal delay parameters are not present and the CPB operates at an access unit level. The syntax element num_units_in_sub_tick represents the number of time units of a clock operating at the frequency time_scale Hz that corresponds to one increment (called a sub-picture clock tick) of a sub-picture clock tick counter. The HRD parameters discussed above may be applicable to all temporal layer representations.

The syntax element viii video_parameters_present_flag set equal to 1 specifies that the vui_vps( ) syntax structure is present in the VPS. This flag set equal to 0 specifies that the vui_vps( ) syntax element is not present. The syntax element num_vps_short_term_ref_pic_sets specifies the number of short-term reference picture sets that are specified in the video parameter set. The syntax element bitrate_info_present_flag[i] set equal to 1 specifies that the bit rate information for the i-th temporal layer is present in the video parameter set. The syntax element bitrate_info_present_flag[i] set to 0 specifies that the bit rate information for the i-th temporal layer is not present in the VPS.

The syntax element frm_rate_info_present_flag[i] set to 1 specifies that frame rate information for the i-th temporal layer is present in the video parameter set. The syntax element frm_rate_info_present_flag[i] set equal to 0 specifies that frame rate information for the i-th temporal layer is not present in the video parameter set.

The syntax element avg_bitrate[i] indicates the average bit rate of the i-th temporal layer representation. The average bit rate for the i-th temporal layer representation in bits per second is given by BitRateBPS(avg_bitrate[i]) with the function BitRateBPS( ) being specified by $$BitRateBPS(x)=(x\&(2^{14}-1))*10^{(2+(x>>14))}$$

The average bit rate may be derived according to the access unit removal time specified in Annex C of the HEVC standard. In the following, bTotal is the number of bits in all NAL units of the i-th temporal layer representation, $t_1$ is the removal time (in seconds) of the first access unit to which the VPS applies, and $t_2$ is the removal time (in seconds) of the last access unit (in decoding order) to which the VPS applies.

With x specifying the value of avg_bitrate[i], the following applies:

If $t_1$ is not equal to $t_2$, the following condition may be true:

$$(x\&(2^{14}-1))==Round(bTotal\div((t_2-t_1)*10^{(2+(x>>14))}))$$

Otherwise ($t_1$ is equal to $t_2$), the following condition may be true:

$$(x\&(2^{14}-1))==0$$

The syntax element max_bitrate_layer[i] indicates an upper bound for the bit rate of the i-th temporal layer representation in any one-second time window, of access unit removal time as specified in Annex C. The upper bound for the bit rate of the current scalable layer in bits per second is given by BitRateBPS(max_bitrate_layer[i]) with the function BitRateBPS( ) being specified in Equation G-369. The bit rate values are derived according to the access unit removal time specified in Annex C of this Recommendation|International Standard. In the following, $t_1$ is any point in time (in seconds), $t_2$ is set equal to $t_1$+max_bitrate_calc_window[i]÷100, and bTotal is the number of bits in all NAL units of the current scalable layer that belong to access units with a removal time greater than or equal to $t_1$ and less than $t_2$. With x specifying the value of max_bitrate_layer[i], the following condition may be obeyed for all values of $t_1$:
$(x\&(2^{14}-1))>=bTotal\div((t_2-t_1)*10^{(2+(x>>14))})$.

The syntax element constant_frm_rate_idc[i] indicates whether the frame rate of the i-th temporal layer representation is constant. In the following, a temporal segment tSeg is any set of two or more consecutive access units, in decoding order, of the current temporal layer representation, fTotal(tSeg) is the number of pictures, in the temporal segment tSeg, $t_1$(tSeg) is the removal time (in seconds) of the first access unit (in decoding order) of the temporal segment tSeg, $t_2$(tSeg) is the removal time (in seconds) of the last access unit (in decoding order) of the temporal segment tSeg, and avgFR(tSeg) is the average frame rate in the temporal segment tSeg, which is given by:

$$avgFR(tSeg)==Round(fTotal(tSeg)*256\div(t_2(tSeg)-t_1(tSeg)))$$

If the i-th temporal layer representation does only contain one access unit or the value of avgFR(tSeg) is constant over all temporal segments of the i-th temporal layer representation, the frame rate is constant; otherwise, the frame rate is not constant. The syntax element constant_frm_rate_idc[i] set equal to 0 indicates that the frame rate of the i-th temporal layer representation is not constant. The syntax element constant_frm_rate_idc[i] set equal to 1 indicates that the frame rate of the i-th temporal layer representation is constant.

The syntax element constant_frm_rate_idc[i] set equal to 2 indicates that the frame rate of the i-th temporal layer representation may or may not be constant. The value of constant_frm_rate_idc[i] may be in the range of 0 to 2, inclusive.

The syntax element avg_frm_rate[i] indicates the average frame rate, in units of frames per 256 seconds, of the i-th temporal layer representation. With fTotal being the number of pictures in the i-th temporal layer representation, $t_1$ being the removal time (in seconds) of the first access unit to which the VPS applies, and $t_2$ being the removal time (in seconds) of the last access unit (in decoding order) to which the VPS applies, the following applies:

If $t_1$ is not equal to $t_2$, the following condition may be true:

avg_frm_rate[i]=Round(fTotal*256÷($t_2$−$t_1$))

Otherwise ($t_1$ is equal to $t_2$), the following condition may be true:

avg_frm_rate[i]==0

VUI parameters semantics will now be described. Each syntax element in the VUI parameters has the same semantics as the syntax element with the same name in the VUI parameters syntax as specified in WD7.

Sequence parameter set RBSP semantics will now be described. The syntax element use_rps_from_vps_flag set equal to 1 specifies that the short-term reference pictures sets included in the sequence parameter set are additive to the short-term reference pictures sets included in the referred video parameter set. The syntax element use_rps_from_vps_flag set equal to 0 specifies that the short-term reference pictures sets included in the sequence parameter set override the short-term reference pictures sets included in the referred video parameter set.

Alternatively, the syntax element num_short_term_ref_pic_sets may not be present in the SPS and may always be inferred to be set equal to 0. Alternatively, the syntax element use_rps_from_vps_flag may not be present and may always be inferred to be set equal to 1. Alternatively, the syntax element use_rps_from_vps_flag may not be present and may always be inferred to be set equal to 0.

The variable NumShortTermRefPicSets can be derived as follows.

NumShortTermRefPicSets=num_short_term_ref_pic_sets if(use_rps_from_vps_flag)

NumShortTermRefPicSets+=num_vps_short_term_ref_pic_sets

Slice header semantics will now be described. The syntax element short_term_ref_pic_set_idx specifies the index to the list of the short-term reference picture sets specified in the active sequence parameter set that may be used for creation of the reference picture set of the current picture. The syntax element short_term_ref_pic_set_idx may be represented by Ceil(Log 2(NumShortTermRefPicSets)) bits. The value of short_term_ref_pic_set_idx may be in the range of 0 to num_short_term_ref_pic_sets−1, inclusive, where num_short_term_ref_pic_sets is the syntax element from the active sequence parameter set.

The variable StRpsIdx may be derived as follows.

if(short_term_ref_pic_set_sps_flag)

StRpsIdx=short_term_ref_pic_set_idx else

StRpsIdx=NumShortTermRefPicSets

The syntax element tiles_fixed_structure_idc set equal to 0 indicates that each picture parameter set referred to by any picture in the coded video sequence has tiles_or_entropy_coding_sync_idc set equal to 0. The syntax element tiles_fixed_structure_idc set equal to 1 indicates that each picture parameter set that is referred to by any picture in the coded video sequence has the same value of the syntax elements num_tile_columns_minus1, num_tile_rows_minus1, uniform_spacing_flag, column_width[i], row_height [i] and loop_filter_across_tiles_enabled_flag, when present.

The syntax element tiles_fixed_structure_idcg set equal to 2 indicates that tiles syntax elements in different picture parameter sets that are referred to by pictures in the coded video sequence may or may not have the same value. The value of tiles_fixed_structure_idc may be in the range of 0 to 2, inclusive. When the syntax element tiles_fixed_structure_flag is not present, it is inferred to be equal to 2.

The signaling of the syntax element tiles_fixed_structure_flag set equal to 1 may be a guarantee to a decoder that each picture in the coded video sequence has the same number of tiles distributed in the same way which might be useful for workload allocation in the case of multi-threaded decoding.

A second example, similar to the first example described above, will now be described. In this second example, the syntax elements remaining in the SPS may be present in the VPS and conditionally present in the SPS. The syntax and semantics of the VPS and SPS according to this example are changed and described below in Tables 7-9.

TABLE 7

| Video parameter set RBSP syntax | |
|---|---|
| video_parameter_set_rbsp( ) { | Descriptor |
|   vps_max_temporal_layers_minus1 | u(3) |
|   vps_max_layers_minus1 | u(5) |
|   profile_space | u(3) |
|   profile_idc | u(5) |
|   for(j = 0; j < 32; j++ ) | |
|     profile_compatability_flag[ i ] | u(1) |
|   constraint_flags | u(16) |
|   level_idc | u(8) |
|   level_lower_temporal_layers_present_flag | u(1) |
|   if( level_lower_temporal_layers_present_flag ) | |
|     for ( i = 0; i < vps_max_temporal_layers_minus1; i++ ) | |
|       level_idc_temporal_subset[ i ] | u(8) |
|   video_parameter_set_id | u(5) |
|   vps_temporal_id_nesting_flag | u(1) |
|   chroma_format_idc | u(2) |
|   if( chroma_format_idc = = 3 ) | |
|     separate_colour_plane_flag | u(1) |
|   bit_depth_luma_minus8 | u(2) |
|   bit_depth_chroma_minus8 | u(2) |
|   pic_width_in_luma_samples | u(16) |
|   pic_height_in_luma_samples | u(16) |
|   for ( i = 0; i <= vps_max_temporal_layers_minus1; i++ ) { | |
|     bitrate_info_present_flag[ i ] | u(1) |
|     frm_rate_info_present_flag[ i ] | u(1) |
|     if( bitrate_info_present_flag[ i ] ) { | |
|       avg_bitrate[ i ] | u(16) |
|       max_bitrate [ i ] | u(16) |
|     } | |
|     if( frm_rate_info_present_flag[ i ] ) { | |
|       constant_frm_rate_idc[ i ] | u(2) |
|       avg_frm_rate[ i ] | u(16) |
|     } | |
|   } | |
|   next_essential_info_byte_offset | u(12) |
|   pic_cropping_flag | u(1) |
|   if( pic_cropping_flag ) { | |
|     pic_crop_left_offset | ue(v) |
|     pic_crop_right_offset | ue(v) |
|     pic_crop_top_offset | ue(v) |
|     pic_crop_bottom_offset | ue(v) |
|   } | |
|   for ( i = 0, nalHrdPresent = 0, vclHrdPresent = 0; | |
|     i <= vps_max_temporal_layers_minus1; i++ ) { | |
|     nal_hrd_parameters_present_flag[ i ] | u(1) |
|     if( nal_hrd_parameters_present_flag[ i ] ) { | |
|       hrd_parameters( nalHrdPresent ) | |
|       nalHrdPresent++ | |
|     } | |
|     vcl_hrd_parameters_present_flag[ i ] | u(1) |
|     if( vcl_hrd_parameters_present_flag[ i ] ) { | |

TABLE 7-continued

Video parameter set RBSP syntax

| video_parameter_set_rbsp( ) { | Descriptor |
|---|---|
|     hrd_parameters( vclHrdPresent ) | |
|     vclHrdPresent++ | |
|   } | |
|   if( nalHrdPresent + vclHrdPresent = = 1 ) { | |
|     low_delay_hrd_flag | u(1) |
|     sub_pic_cpb_params_present_flag | u(1) |
|     num_units_in_sub_tick | u(32) |
|   } | |
|   vps_max_dec_pic_buffering[ i ] | ue(v) |
|   vps_num_reorder_pics[ i ] | ue(v) |
|   vps_max_latency_increase[ i ] | ue(v) |
| } | |
| vui_parameters_present_flag | u(1) |
| if ( vui_parameters_present_flag ) | |
|   vui_parameters( ) | |
| num_vps_short_term_ref_pic_sets | ue(v) |
| for( i = 0; i < num_vps_short_term_ref_pic_sets; i++ ) | |
|   short_term_ref_pic_set( i ) | |
| optional_sps_parameters( ) | |
| vps_extension_flag | u(1) |
| if( vps_extension_flag ) | |
|   while( more_rbsp_data( ) ) | |
|     vps_extension_data_flag | u(1) |
| } | |
| rbsp_trailing_bits( ) | |
| } | |

TABLE 8

Sequence parameter set RBSP syntax

| seq_parameter_set_rbsp( ) { | Descriptor |
|---|---|
|   seq_parameter_set_id | ue(v) |
|   video_parameter_set_id | ue(v) |
|   num_short_term_ref_pic_sets | ue(v) |
|   use_rps_from_vps_flag | u(1) |
|   for( i = 0; i < num_short_term_ref_pic_sets; i++ ) { | |
|     idx = use_rps_from_vps_flag ? | |
|     num_vps_short_term_ref_pic_sets + i : i | |
|     short_term_ref_pic_set( idx ) | |
|   } | |
|   sps_parameters_override_flag | u(1) |
|   if( sps_parameters_override_flag ) { | |
|     optional_sps_parameters( ) | |
|   sps_extension_flag | u(1) |
|   if( sps_extension_flag ) | |
|     while( more_rbsp_data( ) ) | |
|       sps_extension_data_flag | u(1) |
|   rbsp_trailing_bits( ) | |
| } | |

TABLE 9

Optional SPS parameters

| optional_sps_parameters( ) { | |
|---|---|
|   pcm_enabled_flag | u(1) |
|   if( pcm_enabled_flag ) { | |
|     pcm_sample_bit_depth_luma_minus1 | u(4) |
|     pcm_sample_bit_depth_chroma_minus1 | u(4) |
|   } | |
|   log2_max_pic_order_cnt_lsb_minus4 | ue(v) |
|   restricted_ref_pic_lists_flag | u(1) |
|   if( restricted_ref_pic_lists_flag ) | |
|     lists_modification_present_flag | u(1) |
|   log2_min_coding_block_size_minus3 | ue(v) |
|   log2_diff_max_min_coding_block_size | ue(v) |
|   log2_min_transform_block_size_minus2 | ue(v) |
|   log2_diff_max_min_transform_block_size | ue(v) |

TABLE 9-continued

Optional SPS parameters

|   if( pcm_enabled_flag ) { | |
|---|---|
|     log2_min_pcm_coding_block_size_minus3 | ue(v) |
|     log2_diff_max_min_pcm_coding_block_size | ue(v) |
|   } | |
|   max_transform_hierarchy_depth_inter | ue(v) |
|   max_transform_hierarchy_depth_intra | ue(v) |
|   scaling_list_enable_flag | u(1) |
|   if( scaling_list_enable_flag ) { | |
|     sps_scaling_list_data_present_flag | u(1) |
|     if( sps_scaling_list_data_present_flag ) | |
|       scaling_list_param( ) | |
|   } | |
|   chroma_pred_from_luma_enabled_flag | u(1) |
|   transform_skip_enabled_flag | u(1) |
|   seq_loop_filter_across_slices_enabled_flag | u(1) |
|   asymmetric_motion_partitions_enabled_flag | u(1) |
|   nsrqt_enabled_flag | u(1) |
|   sample_adaptive_offset_enabled_flag | u(1) |
|   adaptive_loop_filter_enabled_flag | u(1) |
|   if( adaptive_loop_filter_enabled_flag ) | |
|     alf_coef_in_slice_flag | u(1) |
|   if( pcm_enabled_flag ) | |
|     pcm_loop_filter_disable_flag | u(1) |
|   if( log2_min_coding_block_size_minus3 = = 0 ) | |
|     inter_4x4_enabled_flag | u(1) |
|   long_term_ref_pics_present_flag | u(1) |
|   sps_temporal_mvp_enable_flag | u(1) |
|   tiles_fixed_structure_idc | u(2) |
| } | |

The optional SPS parameters semantics will now be described. The semantics of the syntax elements and syntax structures in this syntax structure have the same semantics as those syntax elements in the SPS with the same syntax element names as specified in the first example.

Sequence parameter set RBSP semantics will now be described. The syntax element sps_parameters_override_flag set equal to 1 specifies that the values of the syntax elements and syntax structures from pcm_enabled_flag through tiles_fixed_structure_idc as specified in the sequence parameter set override the values of the same syntax elements and syntax structures as specified in the referred video parameter set. The syntax element sps_parameters_override_flag set equal to 0 the values of the syntax elements and syntax structures from pcm_enabled_flag through tiles_fixed_structure_idc as specified in the referred video parameter set are in use.

The syntax element next_essential_byte_offset shown in Table 7 may be processed and parsed by MANE 29 and/or video decoder 30 in the manner described above with reference to Table 2. Similarly, the syntax elements, video_parameter_set_id, profile_idc, and profile_space may also be generated by video decoder 30 and processed and parsed by video decoder 30 in the manner described above.

A third example is a superset of the first example. In this third example, the syntax may be designed in a manner that makes extensions easier to implement. In addition, an extension of the VPS may be supported in this example. The syntax design or semantics design of a syntax table which is exactly the same as the counterpart in the first example is not present. The third example is described below with reference to Tables 10-19.

TABLE 10

Video parameter set RBSP syntax (base specification only)

| video_parameter_set_rbsp( ) { | Descriptor |
|---|---|
|   vps_max_temporal_layers_minus1 | u(3) |
|   vps_max_layers_minus1 | u(5) |
|   profile_level_info( 0, | |
|   vps_max_temporal_layers_minus1 ) | |
|   video_parameter_set_id | u(5) |
|   vps_temporal_id_nesting_flag | u(1) |
|   rep_format_info( 0, 0 ) | |
|   bitrate_framerate_info( 0, | |
|   vps_max_temporal_layers_minus1 ) | |
|   next_essential_info_byte_offset | u(12) |
|   rep_format_info( 0, 1 ) | |
|   for( i = 0; i <= vps_max_temporal_layers_minus1; i++ ) { | |
|     vps_max_dec_pic_buffering[ i ] | ue(v) |
|     vps_num_reorder_pics[ i ] | ue(v) |
|     vps_max_latency_increase[ i ] | ue(v) |
|   } | |
|   hrd_info( 0, vps_max_temporal_layers_minus1 ) | |
|   vui_vps_set ( 0 ) | |
|   num_vps_short_term_ref_pic_sets | ue(v) |
|   for( i = 0; i < num_vps_short_term_ref_pic_sets; i++ ) | |
|     short_term_ref_pic_set( i ) | |
|   vps_extension_flag | u(1) |
|   if( vps_extension_flag ) | |
|     while( more_rbsp_data( ) ) | |
|       vps_extension_data_flag | u(1) |
|   rbsp_trailing_bits( ) | |
| } | |

TABLE 11

Video parameter set RBSP syntax (including extension)

| video_parameter_set_rbsp( ) { | Descriptor |
|---|---|
|   vps_max_temporal_layers_minus1 | u(3) |
|   vps_max_layers_minus1 | u(5) |
|   profile_level_info( 0, | |
|   vps_max_temporal_layers_minus1 ) | |
|   video_parameter_set_id | u(5) |
|   vps_temporal_id_nesting_flag | u(1) |
|   rep_format_info( 0, 0 ) | |
|   bitrate_framerate_info( 0, | |
|   vps_max_temporal_layers_minus1 ) | |
|   next_essential_info_byte_offset | u(12) |
|   rep_format_info( 0, 1 ) | |
|   for( i = 0; i <= vps_max_temporal_layers_minus1; i++ ) { | |
|     vps_max_dec_pic_buffering[ i ] | ue(v) |
|     vps_num_reorder_pics[ i ] | ue(v) |
|     vps_max_latency_increase[ i ] | ue(v) |
|   } | |
|   hrd_info( 0, vps_max_temporal_layers_minus1 ) | |
|   vui_vps_set ( 0 ) | |
|   num_vps_short_term_ref_pic_sets | ue(v) |
|   for( i = 0; i < num_vps_short_term_ref_pic_sets; i++ ) | |
|     short_term_ref_pic_set( i ) | |
|   ~~vps_extension_flag~~ | ~~u(1)~~ |
|   bit_equal_to_one | u(1) |
|   vps_extension( ) | |
|   vps_extension_flag | u(1) |
|   if( vps_extension_flag ) | |
|     while( more_rbsp_data( ) ) | |
|       vps_extension_data_flag | u(1) |
|   rbsp_trailing_bits( ) | |
| } | |

TABLE 12

Profile and level information table syntax

| profile_level_info( index, NumTempLevelMinus1 ) { | |
|---|---|
|   profile_space | u(3) |
|   profile_idc | u(5) |
|   for( j = 0; j < 32; j++ ) | |
|     profile_compatability_flag[ I ] | u(1) |
|   constraint_flags | u(16) |
|   level_idc | u(8) |
|   level_lower_temporal_layers_present_flag | u(1) |
|   if( level_lower_temporal_layers_present_flag ) | |
|     for ( i = 0; i < NumTempLevelMinus1; i++ ) | |
|       level_idc[ i ] | u(8) |
|   profileLevelInfoIdx = index | |
| } | |

TABLE 13

Representation format information table syntax

| rep_format_info( index, partIdx ) { | |
|---|---|
|   if( !partIdx ){ | |
|     chroma_format_idc | u(2) |
|     if( chroma_format_idc = = 3 ) | |
|       separate_colour_plane_flag | u(1) |
|     bit_depth_luma_minus8 | u(2) |
|     bit_depth_chroma_minus8 | u(2) |
|     pic_width_in_luma_samples | u(16) |
|     pic_height_in_luma_samples | u(16) |
|   } | |
|   else { | |
|     pic_cropping_flag | u(1) |
|     if( pic_cropping_flag ) { | |
|       pic_crop_left_offset | ue(v) |
|       pic_crop_right_offset | ue(v) |
|       pic_crop_top_offset | ue(v) |
|       pic_crop_bottom_offset | ue(v) |
|     } | |
|   } | |
|   repFormatInfoIdx = index | |
| } | |

TABLE 14

Bitrate and frame rate information table syntax

| bitrate_framerate_info( TempLevelLow, TempLevelHigh ){ | |
|---|---|
|   for( i = TempLevelLow; i <= TempLevelHigh; i++ ) { | |
|     bitrate_info_present_flag[ i ] | u(1) |
|     frm_rate_info_present_flag[ i ] | u(1) |
|     if( bitrate_info_present_flag[ i ] ) { | |
|       avg_bitrate[ i ] | u(16) |
|       max_bitrate [ i ] | u(16) |
|     } | |
|     if( frm_rate_info_present_flag[ i ] ) { | |
|       constant_frm_rate_idc[ i ] | u(2) |
|       avg_frm_rate[ i ] | u(16) |
|     } | |
|   } | |
| } | |

TABLE 15

HRD temporal operation points information table syntax

| hrd_info( TempLevelLow, TempLevelHigh ) { | |
|---|---|
|   for ( i = TempLevelLow, nalHrdPresent = 0, vclHrdPresent = 0; | |
|     i <= NumTempLevelMinus1; i++ ) { | |
|     nal_hrd_parameters_present_flag[ i ] | u(1) |
|     if( nal_hrd_parameters_present_flag[ i ] ) { | |
|       hrd_parameters( nalHrdPresent ) | |
|       nalHrdPresent++ | |
|     } | |

TABLE 15-continued

HRD temporal operation points information table syntax

```
    vcl_hrd_parameters_present_flag[ i ]                         u(1)
    if( vcl_hrd_parameters_present_flag[ i ] ) {
      hrd_parameters( vclHrdPresent )
      vclHrdPresent++
    }
    if( nalHrdPresent + vclHrdPresent = = 1 ) {
      low_delay_hrd_flag                                          u(1)
      sub_pic_cpb_params_present_flag                             u(1)
      num_units_in_sub_tick                                       u(32)
    }
  }
}
```

TABLE 16

VUI VPS set table syntax

```
vui_vps_set( index ) {
  vui_video_parameters_present_flag                               u(1)
  if( vui_video_parameters_present_flag )
    vui_parameters( )
  vuiVpsSetIndex = index
}
```

TABLE 17

VPS extension syntax

```
vps_extension( ) {
  byte_alligned_bits                                              u(v)
  num_additional_profile_level_info                               u(4)
  num_additional_rep_fromat_info                                  u(3)
  num_additional_dependency_operation_points                      u(8)
  extension_type                                                  u(3)
  for( i =0; i< num_additional_profile_level_info; i++ )
    profile_level_info( i + 1,
    vps_max_temporal_layers_minus1 )
  for( i = 0; i < num_additional_rep_fromat_info; i++ )
    rep_format_info( i+1, 0 )
  for (k=0; k< num_additional_dependency_operation_points
  ;k++) {
    if( num_additional_profile_level_info )
      profile_level_index[ k ]                                    u(4)
    if( num_additional_rep_fromat_info )
      ref_format_index[ k ]                                       u(3)
    applicable_lowest_temporal_id[ k ]                            u(3)
    applicable_highest_temporal_id[ k ]                           u(3)
  }
  for (k=0; k< num_additional_dependency_operation_points;
  k++) {
    bitrate_framerate_info( applicable_lowest_temporal_id[
              k ], applicable_highest_temporal_id[ k ] )
  }
  // layer dependency
  for (k=0; k< num_additional_dependency_operation_points;
  k++) {
    if( extension_type = = 0 ) { /* Condition always true
    for 3DV */
      depth_included_flag[ k ]                                    u(1)
      num_target_output_views_minus1[ k ]                         u(5)
      num_depedent_layers[ k ]                                    u(5)
      for( j = 0; j < num_target_output_views_minus1[ k ];
      j++ )
        layer_id[ k ][ j ]                                        u(5)
      for( j = 0; j < num_depedent_layers[ k ];
      j++ )
        dependent_layer_id[ k ][ j ]                              u(5)
    }
    else if( extension_type = = 1 )
      layer_id[ k ]                                               u(5)
  }
  for( i = 0; i < num_additional_rep_fromat_info; i++ )
    rep_format_info( i + 1, 1 )
// boundary of the fixed-length and ue(v)
```

TABLE 17-continued

VPS extension syntax

```
//vui
  num_additional_vui_vps_set_info                                 ue(v)
  for( i = 0; i < num_additional_vui_vps_set_info; i++ )
    vui_vps_set( i + 1 )
  for (k=0; k< num_additional_dependency_operation_points;
  k++) {
    if (num_additional_vui_vps_set_info)
      vui_vps_set_idx                                             ue(v)
    hrd_info(applicable_lowest_temporal_id[ k ],
             applicable_highest_temporal_id[ k ])
  }
}
```

Video parameter set RBSP semantics will now be described. The syntax element byte_alligned_bits specifies the possible bits that make the bits in the VPS NAL unit prior to num_additional_profile_level_info_byte aligned. The syntax element byte_alligned_bits is in the range of 0 to 7, inclusive. The syntax element num_additional_profile_level_info specifies the number of additional profile and level information table present in the VPS. The syntax element num_additional_rep_fromat_info specifies the number of additional Representation format information tables present in the VPS. The syntax element num_additional_dependency_operation_points specifies the number of dependency operation points further present in the bitstream, regardless of temporal scalability. Each dependency operation point may include temporal sub operation points, each have the same layer structure. The syntax element extension_type specifies the type of the extension of the current bitstream, with 0 corresponding to 3DV and 1 corresponding to SVC. The syntax element profile_level_index[k] indicates the index to the level information table signaled in the VPS for the current k-th dependency operation point. The syntax element ref_format_index indicates the index to the representation format information table signaled in the VPS for the current k-th dependency operation point.

The syntax element applicable_lowest_temporal_id[k] and applicable_highest_temporal_id[k] specify respectively the lowest temporal_id value and the highest temporal_id value corresponding to the signaled temporal sub operation points of the k-th dependency operation point. Alternatively, the syntax elements applicable_lowest_temporal_id[k] and applicable_highest_temporal_id[k] are both not signaled and inferred to be equal to 0 and vps_max_temporal_layers_minus1 respectively. Alternatively, the syntax element applicable_lowest_temporal_id[k] is not signaled and inferred to be equal to 0. Alternatively, the syntax element applicable_highest_temporal_id[k] is not signaled and inferred to be equal to vps_max_temporal_layers_minus1.

The syntax element depth_included_flag[k] equal to 1 indicates that the current 3DV dependency operation point contains depth. This flag equal to 0 indicates that the current 3DV operation point does not contain depth. Alternatively, the syntax element depth_included_flag[k] is not signaled, thus indicating a depth VCL NAL unit relies on the layer_id_plus1.

The syntax element num_target_output_views_minus1 [k] plus 1 specifies the number of target output views in the k-th dependency operation point. The syntax element num_depedent_layers[k] indicates the number of dependent layers for decoding the current k-th dependency operation point. The syntax element layer_id[k][j] indicates the layer_id of the j-th target output view of the k-th dependency operation point. The syntax element dependent_layer_id[k] [j] indicates the layer_id of the j-th dependent view of the k-th dependency operation point. In one alternative, a flag is signaled, right after dependent_layer_id[k][j], as direct_dependent_flag[k][j].

The syntax element direct_dependent_flag[k][j] indicates whether the j-th dependent view is a directly dependent view, to be used to derive inter-vie RPS. The syntax element layer_id[k] indicates the highest layer_id of the current k-th (SVC) dependency operation point. Alternately, num_target_output_views_minus1 [k], num_depedent_layers[k], layer_id[k][j] and dependent_layer_id[k][j] can be signaled as ue(v).

The syntax element num_additional_vui_vps_set_info may specify the number of additional VUI VPS set table present in the VPS.

For profile and level information table semantics, the syntax element profileLevelInfoIdx indicates the index of the profile and level information table. For representation format information table semantics, the syntax element repFormatInfoIdx indicates the index of the representation format information table.

The syntax element next_essential_byte_offset shown in Table 7 may be processed and parsed by MANE 29 and/or video decoder 30 in the manner described above with reference to Table 2.

For VUI VPS set table semantics, the syntax element vuiVpsSetIndex indicates the index of the VUI VPS set table.

Alternatively, the view dependency of each view can be signaled in the SPS, as follows:

TABLE 18

| seq_parameter_set_rbsp( ) { | Descriptor |
|---|---|
| seq_parameter_set_id | ue(v) |
| video_parameter_set_id | ue(v) |
| num_short_term_ref_pic_sets | ue(v) |
| use_rps_from_vps_flag | u(1) |
| for( i = 0; i < num_short_term_ref_pic_sets; i++){ | |
|   idx = use_rps_from_vps_flag ? | |
|   num_vps_short_term_ref_pic_sets + i : i | |
|   short_term_ref_pic_set( idx ) | |
| } | |
| sps_parameters_override_flag | u(1) |
| if( sps_parameters_override_flag ) { | |
|   optional_sps_parameters( ) | |
| } | |
| ~~sps_extension_flag~~ | ~~u(1)~~ |
| bit_equal_to_one | u(1) |
| num_reference_views | ue(v) |
| for( i = 0; i < num_reference_views ; i++) | |
|   ref_view_layer_id[ i ] | ue(v) |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

The syntax element num_reference_views indicates the maximum number of texture or depth views used to construct the inter-view RPS subset. The syntax element ref_view_layer_id[i] identifies the layer_id of the i-th texture/depth view used to indicate the i-th inter-view (only) reference picture in the inter-view RPS subset.

Alternatively, the VPS extension can be signaled as follows. When the syntax element extension_type indicates SVC, the syntax element num_additional_dependency_operation_points is not signaled but derived to be equal to vps_max_layers_minus1. A constraint is given that the VCL NAL units within an access unit are in a non-descending order of the layer_id. In MVC, the syntax element layer_id is equivalent to view_idx. In 3DV, the syntax element view_idx may be calculated as follows by layer_id: view_idx=(layer_idx>>1).

TABLE 19

| vps_extension( ) { | |
|---|---|
| byte_allligned_bits | u(v) |
| num_additional_profile_level_info | u(4) |
| num_additional_rep_fromat_info | u(3) |
| extension_type | u(3) |
| if( extension_type != 1 ) { | |
|   num_additional_dependency_operation_points | u(8) |
|   depth_present_flag | u(1) |
| for( i =0; i< num_additional_profile_level_info; i++ ) | |
|   profile_level_info( i + 1, | |
|   vps_max_temporal_layers_minus1 ) | |
| for( i = 0; i < num_additional_rep_fromat_info; i++ ) | |
|   rep_format_info( i+1, 0 ) | |
| for (k=0; k< num_additional_dependency_operation_points ;k++) { | |
|   if( num_additional_profile_level_info ) | |
|     profile_level_index[ k ] | u(4) |
|   if( num_additional_rep_fromat_info ) | |
|     ref_format_index[ k ] | u(3) |
|   applicable_lowest_temporal_id[ k ] | u(3) |
|   applicable_highest_temporal_id[ k ] | u(3) |
| } | |
| for (k=0; k< num_additional_dependency_operation_points; k++) { | |
|   bitrate_framerate_info( applicable_lowest_temporal_id[ k ], applicable_highest_temporal_id[ k ] ) | |
| } | |
| // layer dependency | |
| for (k=0; k< num_additional_dependency_operation_points; k++) { | |
|   if( extension_type = = 0) { /* Condition always true for 3DV */ | |
|     if( depth_present_flag ) | |
|       depth_included_flag[ k ] | u(1) |
|     num_target_output_views_minus1[ k ] | u(5) |
|     num_dependent_layers[ k ] | u(5) |
|     for( j = 0; j < num_target_output_views_minus1[ k ]; j++ ) | |
|       layer_id[ k ][ j ] | u(5) |
|     for( j = 0; j < num_dependent_layers[ k ]; j++ ) | |
|       dependent_layer_id[ k ][ j ] | u(5) |
|   } | |
|   else if( extension_type = = 1) | |
|     layer_id[ k ] | u(5) |
| } | |
| for( i = 0; i < num_additional_rep_fromat_info; i++ ) { | |
|   rep_format_info( i + 1, 1 ) | |
| // boundary of the fixed-length and ue(v) | |
| //vui | |
|   num_additional_vui_vps_set_info | ue(v) |
|   for( i = 0; i < num_additional_vui_vps_set_info; i++ ) | |
|     vui_vps_set( i + 1 ) | |
| for (k=0; k< num_additional_dependency_operation_points; k++) { | |
|   if (num_additional_vui_vps_set_info) | |
|     vui_vps_set_idx | ue(v) |
|   hrd_info(applicable_lowest_temporal_id[ k ], applicable_highest_temporal_id[ k ]) | |
| } | |
| } | |

The syntax element depth_present_flag set equal to 1 indicates that there may be operation points containing depth. The syntax element depth_present_flag set equal to 0 indicates that no operation point contains depth.

The syntax element num_target_output_views_minus1 [k] plus 1 may be used to specify the number of target output views in the k-th dependency operation point. The syntax element num_dependent_layers[k] may be used to indicate the number of dependent layers for decoding the current k-th dependency operation point. When depth_present_flag is set equal to 1, a dependent layer may be either both a depth view or a texture view. The syntax element layer_id[k][j] indicates the layer_id of the j-th target output texture view of the k-th dependency operation point. The layer_id of the depth view, associated with the texture view, if present, is layer_id [k][j]+1.

Alternatively, the syntax element view_idx[k][j] instead of layer_id[k][j] may be signaled for each target output view. For each view_idx[k][j], the layer_id of the corresponding texture view is (view_idx[k][j]<<depth_present_flag). If depth_included_flag[k] is equal to 1, the layer_id of the corresponding depth view is (view_idx[k][j]<<depth_present_flag)+1, which is (view_idx[k][j]<<1)+1 since depth_present_flag must be 1 in this case. Alternatively, the syntax element layer_id[k][j] may be changed to view_idx [k][j] and is u(v) coded, with the length being 5−depth_present_flag. Alternatively, the syntax element layer_id[k][j] may be changed to view_idx[k][j] and is u(v) coded, with the length being 5−depth_included[k].

A fourth example, is a superset of the second example. The syntax is designed in an extension friendly way. In addition, the extension of VPS is provided in this example. The syntax design or semantics design of a syntax table which is exactly the same as the counterpart in the second example is not present.

TABLE 20

Video parameter set RBSP syntax (base spec. only)

| video_parameter_set_rbsp( ) { | Descriptor |
|---|---|
| vps_max_temporal_layers_minus1 | u(3) |
| vps_max_layers_minus1 | u(5) |
| profile_level_info( 0, | |
| vps_max_temporal_layers_minus1 ) | |
| video_parameter_set_id | u(5) |
| vps_temporal_id_nesting_flag | u(1) |
| rep_format_info( 0, 0 ) | |
| bitrate_framerate_info( 0, | |
| vps_max_temporal_layers_minus1 ) | |
| next_essential_info_byte_offset | u(12) |
| rep_format_info( 0, 1 ) | |
| for( i = 0; i <= vps_max_temporal_layers_minus1; i++ ) { | |
|   vps_max_dec_pic_buffering[ i ] | ue(v) |
|   vps_num_reorder_pics[ i ] | ue(v) |
|   vps_max_latency_increase[ i ] | ue(v) |
| } | |
| hrd_info( 0, vps_max_temporal_layers_minus1 ) | |
| vui_vps_set ( 0 ) | |
| num_vps_short_term_ref_pic_sets | ue(v) |
| for( i = 0; i < num_vps_short_term_ref_pic_sets; i++ ) | |
|   short_term_ref_pic_set( i ) | |
| optional_sps_parameters( ) | |
| vps_extension_flag | u(1) |
| if( vps_extension_flag ) | |
|   while( more_rbsp_data( ) ) | |
|     vps_extension_data_flag | u(1) |
| } | |
| } | |
| rbsp_trailing_bits( ) | |
| } | |

TABLE 21

Video parameter set RBSP syntax (including extension)

| video_parameter_set_rbsp( ) { | Descriptor |
|---|---|
| vps_max_temporal_layers_minus1 | u(3) |
| vps_max_layers_minus1 | u(5) |
| profile_level_info( 0, | |

TABLE 21-continued

Video parameter set RBSP syntax (including extension)

| video_parameter_set_rbsp( ) { | Descriptor |
|---|---|
| vps_max_temporal_layers_minus1 ) | |
| video_parameter_set_id | u(5) |
| vps_temporal_id_nesting_flag | u(1) |
| rep_format_info( 0, 0 ) | |
| bitrate_framerate_info( 0, | |
| vps_max_temporal_layers_minus1 ) | |
| next_essential_info_byte_offset | u(12) |
| rep_format_info( 0, 1 ) | |
| for( i = 0; i <= vps_max_temporal_layers_minus1; i++ ) { | |
|   vps_max_dec_pic_buffering[ i ] | ue(v) |
|   vps_num_reorder_pics[ i ] | ue(v) |
|   vps_max_latency_increase[ i ] | ue(v) |
| } | |
| hrd_info( 0, vps_max_temporal_layers_minus1 ) | |
| vui_vps_set ( 0 ) | |
| num_vps_short_term_ref_pic_sets | ue(v) |
| for( i = 0; i < num_vps_short_term_ref_pic_sets; i++ ) | |
|   short_term_ref_pic_set( i ) | |
| optional_sps_parameters( ) | |
| ~~vps_extension_flag~~ | ~~u(1)~~ |
| bit_equal_to_one | u(1) |
| vps_extension( ) | |
| vps_extension_flag | u(1) |
| if( vps_extension_flag ) | |
|   while( more_rbsp_data( ) ) | |
|     vps_extension_data_flag | u(1) |
| } | |
| rbsp_trailing_bits( ) | |
| } | |

The syntax element next_essential_byte_offset shown in Table 21 may be processed and parsed by MANE 29 and/or video decoder 30 in the manner described above with reference to Table 2.

Figure 4:
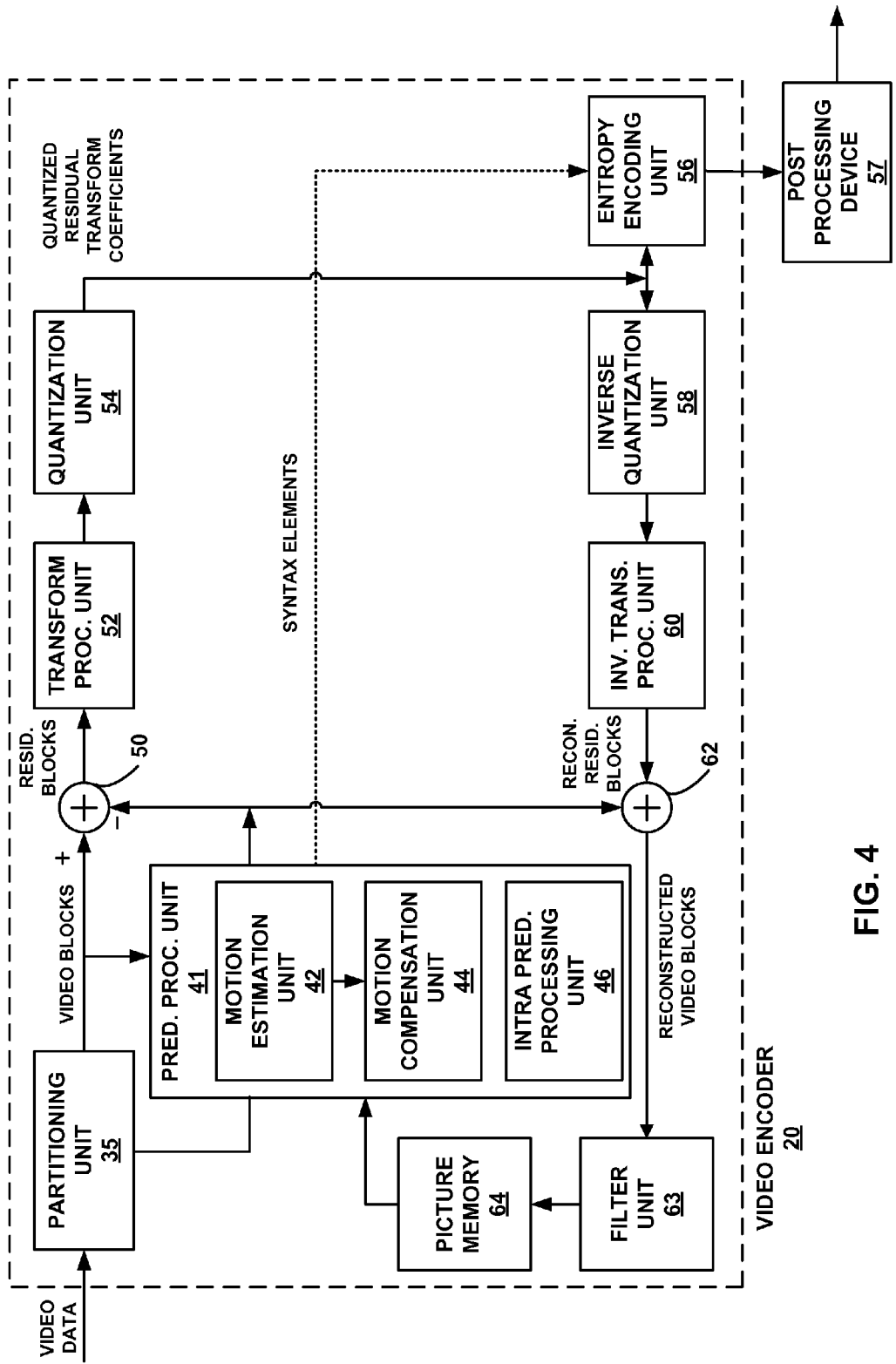
FIG. 4 is a block diagram illustrating an example video encoder that may implement the techniques described in this disclosure.

FIG. 4 is a block diagram illustrating an example video encoder 20 that may implement the techniques described in this disclosure. Video encoder 20 may, for example, generate the syntax structures described above with respect to Tables 1-21. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 4, video encoder 20 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 4 as being an in loop filter, in other configurations, filter unit 63 may be implemented as a post loop filter. FIG. 4 also shows post processing device 57 which may perform additional processing on encoded video data generated by video encoder 20. The techniques of this disclosure, which include generating a parameter set with an offset syntax element, may in some instances be implemented by video encoder 20. In other instances, however, the techniques of this disclosure may be implemented by post processing device 57.

As shown in FIG. 4, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra prediction processing unit 46 may intra-predict a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 (or mode select unit 40, in some examples) may select an appropriate intra-prediction mode to use from the tested modes. For example, intra prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

In any case, after selecting an intra-prediction mode for a block, intra prediction processing unit 46 may provide information indicative of the selected intra-prediction mode for the block to entropy coding unit 56. Entropy coding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, video encoder 20 of FIG. 4 represents an example of a video encoder configured to generate the syntax described above in Tables 1-21. Video encoder 20 may, for example, generate VPS, SPS, PPS, and APS parameter sets as described above. In one example, video encoder 20 may generate a parameter set for coded video data that includes one or more initial fixed-length syntax elements followed by an offset syntax element. The one or more initial fixed-length syntax elements may, for example, include information related to session negotiation. The offset syntax element may indicate a number of bytes to be skipped when the parameter set is processed by a MANE. The number of bytes to be skipped may, for example, include one or more variable length syntax elements. Video encoder 20 may include in the parameter set, following the skipped bytes, additional fixed length syntax elements. The additional fixed-length syntax elements may, for example, include information related to another layer of video data. In one example, the initial fixed length syntax elements may include information related to session negotiation for a base layer, while the additional fixed-length syntax elements may include information related to session negotiation for a non-base layer.

Video encoder 20 may determine the value for the offset syntax element based on the number of bits used to code one or more variable length syntax elements. For example, assume for a first VPS that the syntax elements to be skipped include three fixed-length syntax elements of 2 bits, 3 bits, and 5 bits as well as four variable length syntax elements of 2 bits, 4, bits, 5 bits, and 3 bits. In this example, the fixed length syntax elements include a total of 10 bits while the variable length syntax elements include a total of 14 bits. Thus, for the first VPS, the video encoder 20 may set the value of the offset syntax element to 24 including 24 bits (e.g. 3 bytes) are to be skipped. For a second VPS, the number of bits for the fixed syntax elements will again be 10, but the number of bits used for the variable length syntax elements may be different. Thus, for a second VPS, video encoder 20 may set the value for the offset syntax element to a different value.

The techniques of this disclosure have generally been described with respect to video encoder 20, but as mentioned above, some of the techniques of this disclosure may also be implemented by post processing device 57. For example, post processing device 57 may generate a VPS for multiple layers of video data generated by video encoder 20.

Figure 5:
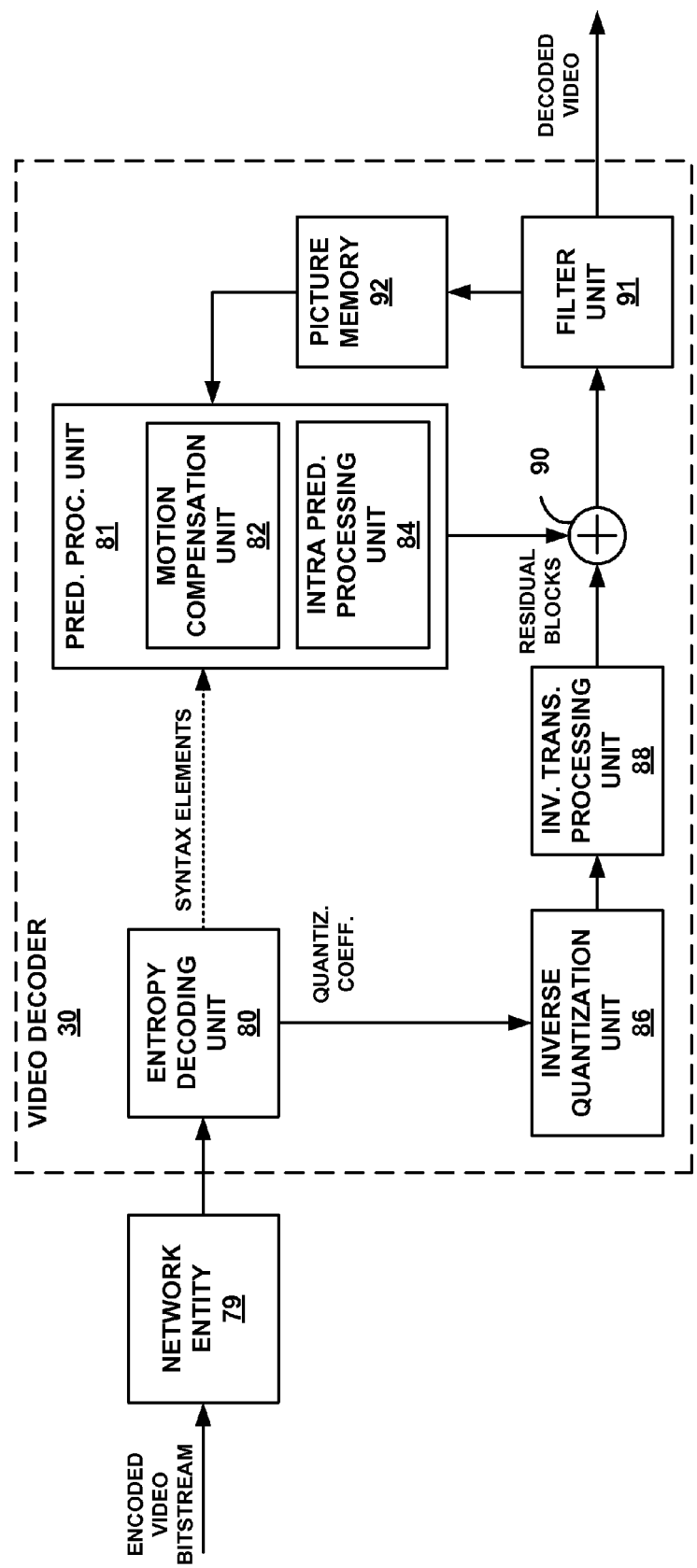
FIG. 5 is a block diagram illustrating an example video decoder that may implement the techniques described in this disclosure.

FIG. 5 is a block diagram illustrating an example video decoder 30 that may implement the techniques described in this disclosure. Video decoder 30 may, for example, be configured to process and parse the syntax structures described above with respect to Tables 1-21. In the example of FIG. 5, video decoder 30 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 4.

During the decoding process, video decoder 30 receives an encoded video bitstream that represents video blocks of an encoded video slice and associated syntax elements from video encoder 20. Video decoder 30 may receive the encoded video bitstream from a network entity 79. Network entity 79 may, for example, be a server, a MANE, a video editor/splicer, or other such device configured to implement one or more of the techniques described above. Network entity 79 may or may not include video encoder 20. As described above, some of the techniques described in this disclosure may be implemented by network entity 79 prior to network entity 79 transmitting the encoded video bitstream to video decoder 30. In some video decoding systems, network entity 79 and video decoder 30 may be parts of separate devices, while in other instances, the functionality described with respect to network entity 79 may be performed by the same device that comprises video decoder 30.

Network entity 79 represents an example of a video processing device configured to process one or more initial syntax elements for a parameter set associated with a video bitstream; receive in the parameter set an offset syntax element for the parameter set that identifies syntax elements to be skipped within the parameter set, and based on the offset syntax element, skip the syntax elements within the parameter set. Network entity 79 may also process one or more additional syntax elements in the parameter set. The one or more additional syntax elements are after the skipped syntax elements in the parameter set.

During the decoding process, video decoder 30 receives an encoded video bitstream that represents video blocks of an encoded video slice and associated syntax elements from video encoder 20. The video blocks may, for example, be routed from video encoder 20 to video decoder 30 via one or more MANEs, such as MANE 29 in FIG. 1 or network entity 79 in FIG. 5. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

As introduced above, entropy decoding unit 80 may process and parse both fixed-length syntax elements and variable-length syntax elements in or more parameter sets, such as a VPS, SPS, PPS, and APS. In one or more of the parameter sets, for example a VPS, video decoder 30 may receive an offset syntax element as described in this disclosure. In response to receiving an offset syntax element, video decoder 30 can essentially ignore the value of the offset syntax element. For example, video decoder 30 may receive an offset syntax element but may continue to decode syntax elements, including variable-length syntax elements, that follow the offset syntax element without skipping any syntax elements.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 5 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as display device 32 of FIG. 1.

In this manner, video decoder 30 of FIG. 5 represents an example of a video decoder configured to parse the syntax described above in Tables 1-21. Video decoder 30 may, for example, parse VPS, SPS, PPS, and APS parameter sets as described above.

Figure 6:
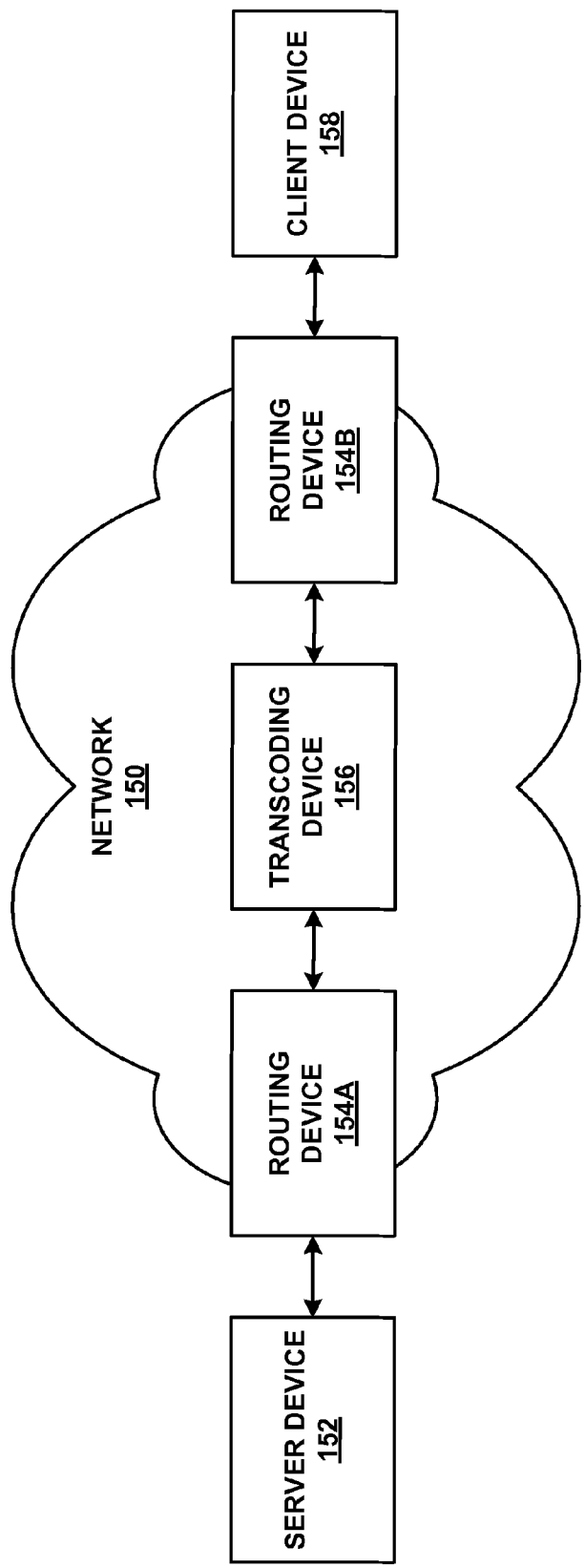
FIG. 6 is a block diagram illustrating an example set of devices that form part of a network.

FIG. 6 is a block diagram illustrating an example set of devices that form part of network 150. In this example, network 150 includes routing devices 154A, 154B (routing devices 154) and transcoding device 156. Routing devices 154 and transcoding device 156 are intended to represent a small number of devices that may form part of network 150. Other network devices, such as switches, hubs, gateways, firewalls, bridges, and other such devices may also be included within network 150. Moreover, additional network devices may be provided along a network path between server device 152 and client device 158. Server device 152 may correspond to source device 12 (FIG. 1), while client device 158 may correspond to destination device 14 (FIG. 1), in some examples. Routing devices 154 may, for example, be MANEs configured to rout media data.

In general, routing devices 154 implement one or more routing protocols to exchange network data through network 150. In general, routing devices 154 execute routing protocols to discover routes through network 150. By executing such routing protocols, routing device 154B may discover a network route from itself to server device 152 via routing device 154A. The various devices of FIG. 6 represent examples of devices that may implement the techniques of this disclosure. Routing devices 154 may, for example, be media aware network elements that are configured to parse the syntax elements of a parameter set, such as a VPS, in accordance with this disclosure. For example, routing devices 154 may receive in a VPS one or more initial fixed length syntax elements and parse and process the fixed length syntax elements. The initial fixed length syntax elements may, for example, be syntax elements related to session negotiation. Routing devices 154 may also receive, in the VPS, an offset syntax element. The offset syntax element may identify a number of bytes to be skipped. Routing device 154 can skip the specified number of bytes, and after skipping the specified number of bytes, can resume parsing and processing fixed length syntax elements within the VPS. The skipped bytes may include one or more variable length syntax elements that routing devices 154 cannot parse because routing devices 154 cannot perform entropy decoding operations.

Figure 7:
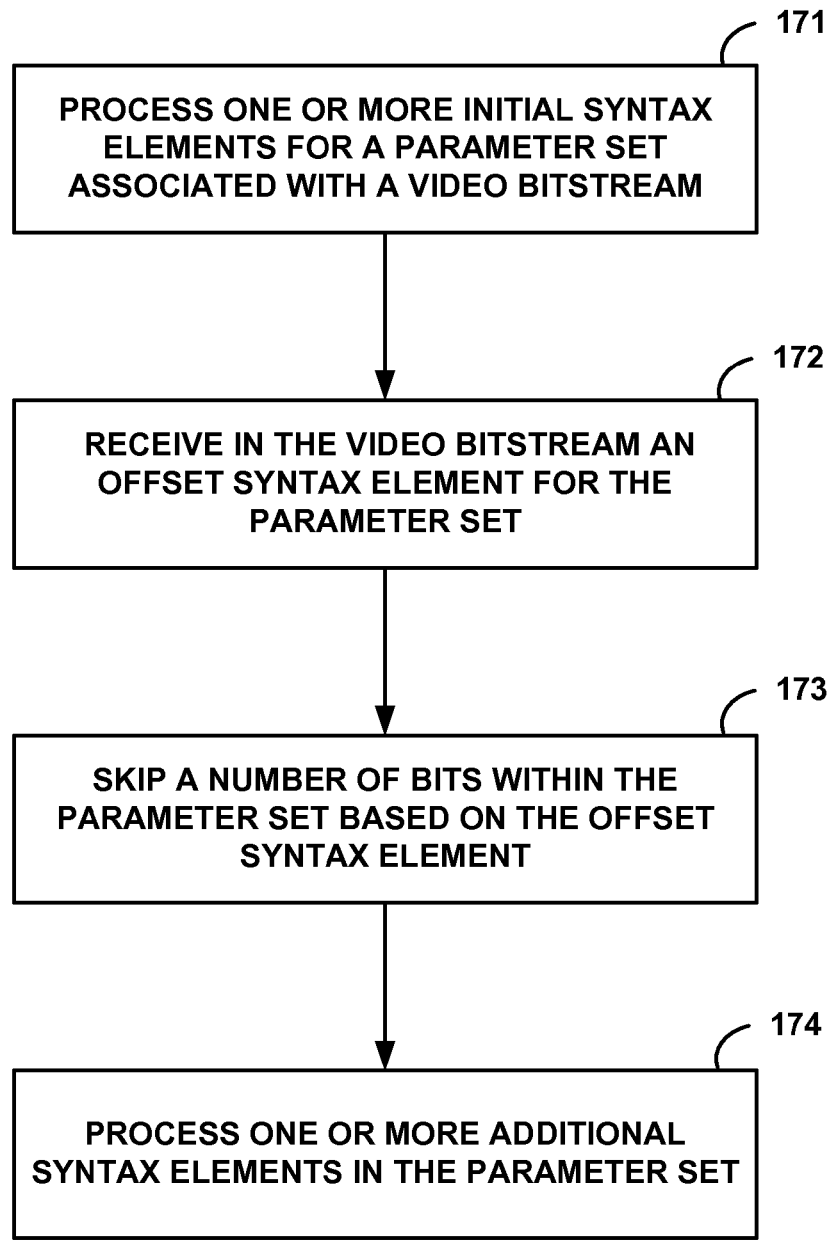
FIG. 7 is a flowchart showing an example method for processing a parameter set in accordance with the techniques of this disclosure.

FIG. 7 is a flowchart illustrating an example of how to process an offset syntax element according to the techniques of this disclosure. The techniques of FIG. 7 will be described with reference to a network device such as MANE 29 of FIG. 1 or one of routing devices 154 in FIG. 6. The network entity processes one or more initial syntax elements for a parameter set associated with a video bitstream (171). The one or more initial syntax elements may additionally include fixed-length syntax elements and precede the offset syntax element. The one or more initial syntax elements may include syntax elements that include information related to session negotiation. Furthermore, the one or more initial syntax elements comprise syntax elements for a base layer of video data and the one or more additional syntax elements comprises syntax elements for a non-base layer of video data.

The network entity receives in the video bitstream an offset syntax element for the parameter set (172). The offset syntax element identifies a number of bits to be skipped within the parameter set. The offset syntax element may, for example, be part of a video parameter set. The number of bits to be skipped may, for example, correspond to one or more syntax elements coded using variable length coding. Based on the offset syntax element, the network entity skips a number of bits within the parameter set (173). The network entity processes one or more additional syntax elements in the parameter set (174). The one or more additional syntax elements are after the number of bits skipped in the parameter set. The one or more additional syntax elements may be additional fixed-length syntax elements, and the one or more additional syntax elements may follow the offset syntax element and follow the bits to be skipped.

Figure 8:
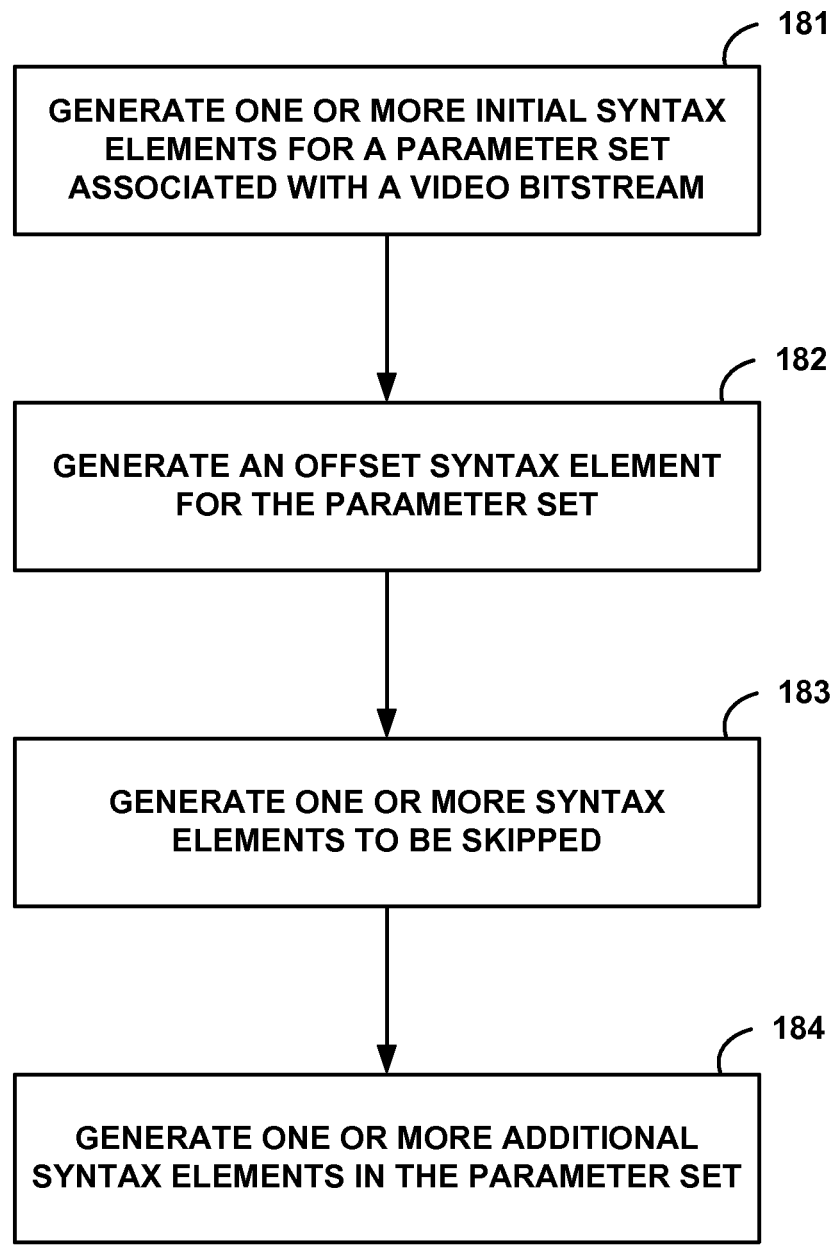
FIG. 8 is a flowchart showing an example method for generating a parameter set in accordance with the techniques of this disclosure.

FIG. 8 is a flowchart illustrating an example of how to process an offset syntax element according to the techniques of this disclosure. The techniques of FIG. 8 will be described with reference to a video processing device configured to encode video data or process encoded video data. Examples of video processing devices configured to process encoded video data in include video encoder 20 of FIGS. 1 and 4 and post processing device 57 of FIG. 4. The video processing devices generates one or more initial syntax elements for a parameter set associated with a video bitstream (181). The one or more initial syntax elements may include fixed-length syntax elements, and the one or more initial syntax elements may precede the offset syntax element. The one or more initial syntax elements may include syntax elements including information related to session negotiation. The one or more initial syntax elements may include syntax elements for a base layer of video data, and the one or more additional syntax elements may include syntax elements for a non-base layer of video data.

The video processing devices generates an offset syntax element for the parameter set (182). The offset syntax element may identify a number of bits to be skipped within the parameter set. The offset syntax element may be part of a video parameter set. The video processing device generates one or more syntax elements to be skipped (183). The bits to be skipped include the one or more syntax elements to be skipped. The one or more syntax elements to be skipped may include one or more syntax elements coded using variable length coding. The video processing device generates one or more additional syntax elements in the parameter set (184). The one or more additional syntax elements are after the number of bits to be skipped in the parameter set. The one or more additional syntax elements may include additional fixed-length syntax elements, the one or more additional syntax elements may follow the offset syntax element and follow the bits to be skipped.

Figure 9:
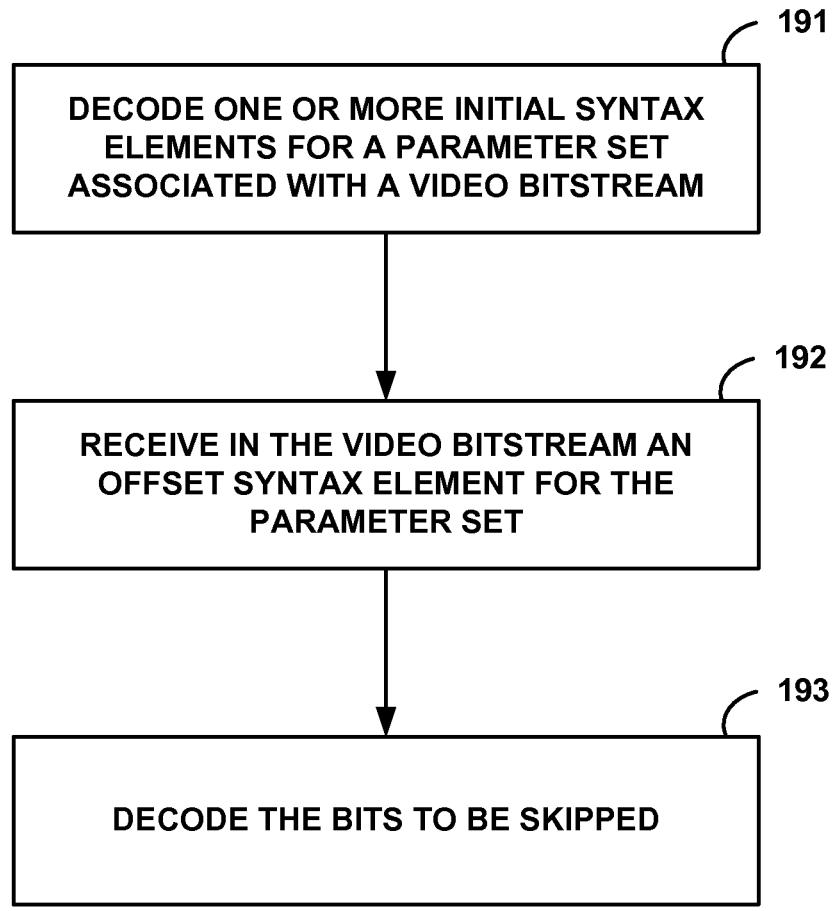
FIG. 9 is a flowchart showing an example method for decoding a parameter set in accordance with the techniques of this disclosure.

FIG. 9 is a flowchart illustrating an example of how to decode an offset syntax element according to the techniques of this disclosure. The techniques of FIG. 9 will be described with reference to a video decoder, such as video decoder 30 of FIGS. 1 and 5. The video decoder decodes one or more initial syntax elements for a parameter set associated with a video bitstream (191). The video decoder receives in the video bitstream an offset syntax element for the parameter set (192). The offset syntax element identifies a number of bits to be skipped within the parameter set. The video decoder decodes the bits to be skipped (193). In some examples, the video decoder decodes the bits to be skipped by performing entropy decoding to decode variable length syntax elements included in the bits to be skipped. The video decoder may, for example, decode the bits to be skipped because the bits are to be skipped when the video data is being processed by a video processing device such as a MANE, but the bits may be necessary for decoding the video data. A MANE, in contrast to a video decoder, may skip the bits in order to perform certain processing on the video data without having to fully decoded the video data. In some instances, a MANE may not even possess all capabilities necessary to decode the video data.

Figure 10:
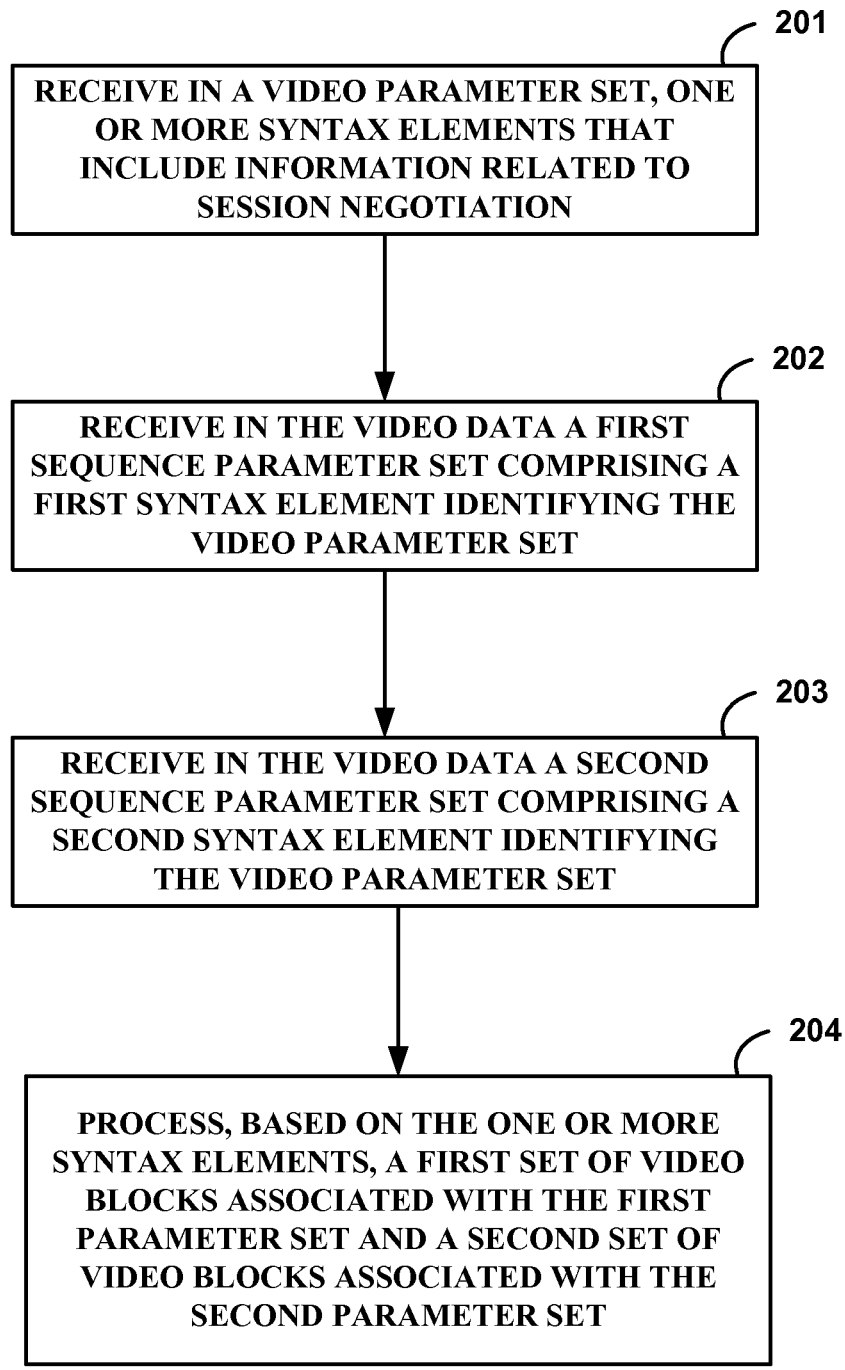
FIG. 10 is a flowchart showing an example method for processing a parameter set in accordance with the techniques of this disclosure.

FIG. 10 is a flowchart illustrating an example of how to process a VPS according to the techniques of this disclosure. The techniques of FIG. 10 will be described with reference to a generic video processing device. The video processing device may correspond to a network device such as MANE 29 of FIG. 1 or one of routing devices 154 in FIG. 6. The video processing device may additionally correspond to a video decoder such as video decoder 30 of FIGS. 1 and 4. The video processing device receives in a video parameter set, one or more syntax elements that include information related to session negotiation (201). The video processing device receives in the video data a first sequence parameter set comprising a first syntax element identifying the video parameter set (202). The first sequence parameter set comprises a first syntax structure that includes a first group of syntax elements that apply to one or more whole pictures of the video data. The video processing device receives in the video data a second sequence parameter set comprising a second syntax element identifying the video parameter set (203). The second sequence parameter set comprises a second syntax structure that includes a second group of syntax elements that apply to one or more different whole pictures of the video data. The video processing device processes, based on the one or more syntax elements, a first set of video blocks associated with the first parameter set and a second set of video blocks associated with the second parameter set (204).

The one or more syntax elements may, for example, be fixed length syntax elements and may precede, in the video parameter set, any variable length coded syntax elements. The one or more syntax elements may include a syntax element identifying a profile of a video coding standard. The one or more syntax elements may further or alternatively includes a syntax element identifying a level of a video coding standard. The level may, for example, correspond to one of multiple levels associated with the profile of the video coding standard.

The one or more syntax elements may include a first syntax element and a second syntax element. The first syntax element may identify a context for interpreting the second syntax element, and the second syntax element may identify a group of profiles. The video processing device may receive, in the video parameter set, one or more compatibility flags, each of which is associated with a profile from the group of profiles. A value for each of the one or more compatibility flags may identify if the video data is compatible with an associated profile from the group of profiles.

The one or more syntax elements may also include a first syntax element that identifies a maximum temporal level associated with the video data and a second syntax element that identifies if a temporal layer of the video data has a level that is lower than the maximum temporal level. In response to the second syntax element indicating a temporal layer of the video data has a level that is lower than the maximum temporal level, the video processing device may receive additional syntax elements that identify levels for one or more temporal layers of the vide data.

In instances when the video processing device is a video decoder, the video decoder may decode the first set of video blocks and the second set of video blocks. In instances when the video processing device is a MANE, the MANE may forward the first set of video blocks and the second set of video blocks to a client device.

Figure 11:
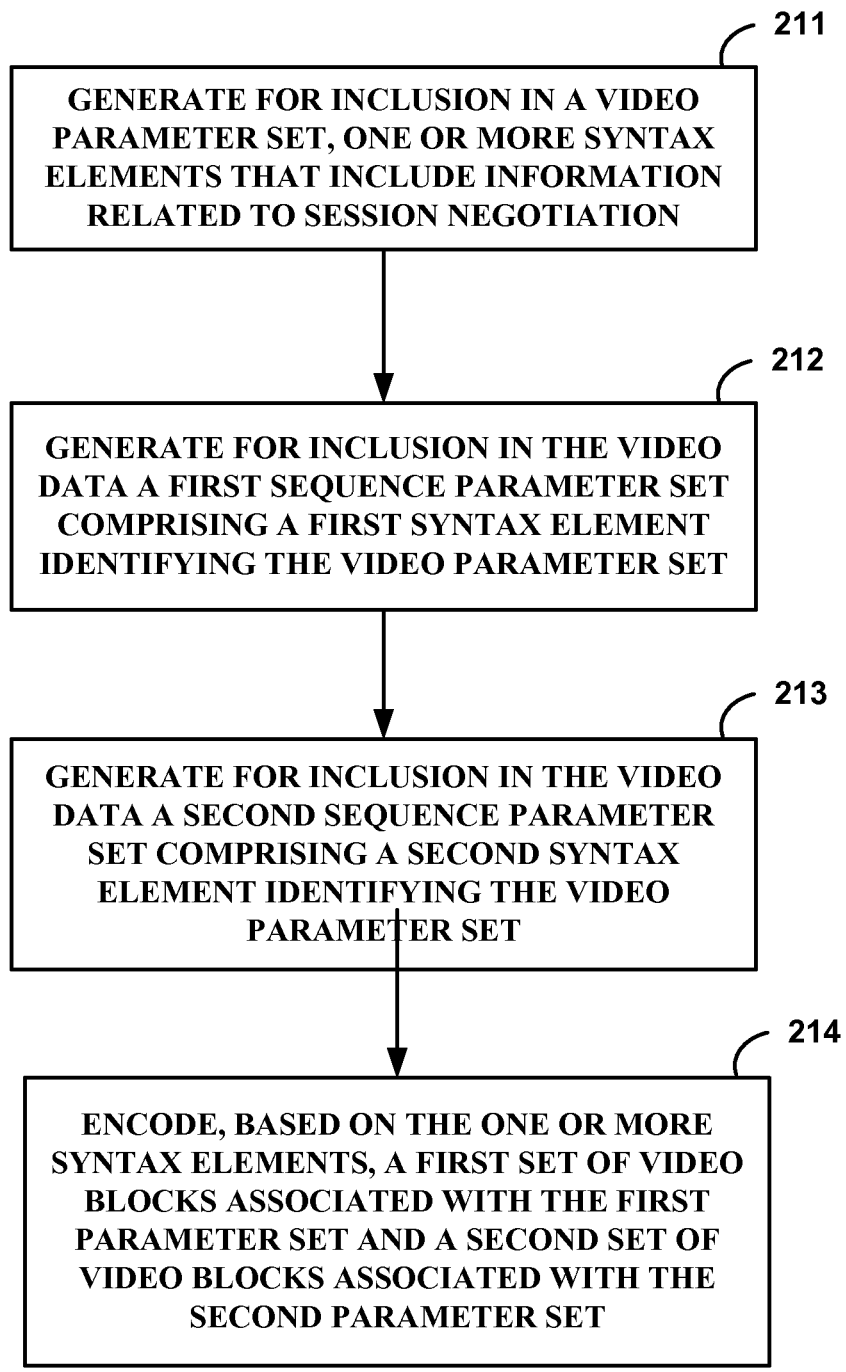
FIG. 11 is a flowchart showing an example method for generating a parameter set in accordance with the techniques of this disclosure.

FIG. 11 is a flowchart illustrating an example of how to generate syntax elements for inclusion in a VPS according to the techniques of this disclosure. The techniques of FIG. 8 will be described with reference to a video processing device configured to encode video data or process encoded video data. Examples of video processing devices configured to process encoded video data in include video encoder 20 of FIGS. 1 and 4 and post processing device 57 of FIG. 4. The video processing device generates for inclusion in a video parameter set, one or more syntax elements that include information related to session negotiation (211). The video processing device generates for inclusion in the video data a first sequence parameter set comprising a first syntax element identifying the video parameter set (212). The first sequence parameter set comprises a first syntax structure that includes a first group of syntax elements that apply to one or more whole pictures of the video data. The video processing device generates for inclusion in the video data a second sequence parameter set comprising a second syntax element identifying the video parameter set (213). The second sequence parameter set comprises a second syntax structure that includes a second group of syntax elements that apply to one or more different whole pictures of the video data. The video processing device encodes, based on the one or more syntax elements, a first set of video blocks associated with the first parameter set and a second set of video blocks associated with the second parameter set (214).

The one or more syntax elements may, for example, be fixed length syntax elements and may precede, in the video parameter set, any variable length coded syntax elements. The one or more syntax elements may include a syntax element identifying a profile of a video coding standard. The one or more syntax elements may further or alternatively includes a syntax element identifying a level of a video coding standard. The level may, for example, correspond to one of multiple levels associated with the profile of the video coding standard.

The one or more syntax elements may include a first syntax element and a second syntax element. The first syntax element may identify a context for interpreting the second syntax element, and the second syntax element may identify a group of profiles. The video processing device may receive, in the video parameter set, one or more compatibility flags, each of which is associated with a profile from the group of profiles. A value for each of the one or more compatibility flags may identify if the video data is compatible with an associated profile from the group of profiles.

The one or more syntax elements may also include a first syntax element that identifies a maximum temporal level associated with the video data and a second syntax element that identifies if a temporal layer of the video data has a level that is lower than the maximum temporal level. In response to the second syntax element indicating a temporal layer of the video data has a level that is lower than the maximum temporal level, the video processing device may receive additional syntax elements that identify levels for one or more temporal layers of the vide data.

Figure 12:
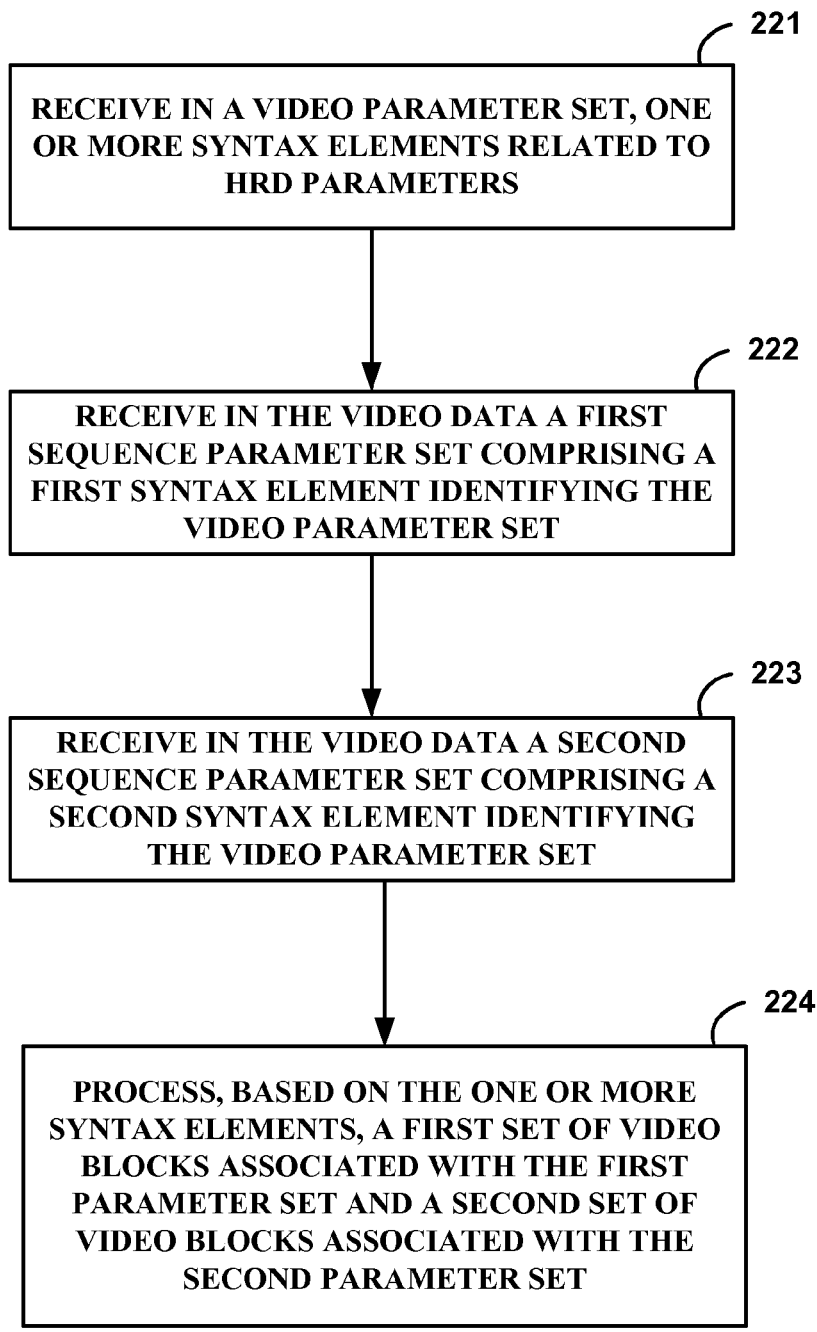
FIG. 12 is a flowchart showing an example method for processing a parameter set in accordance with the techniques of this disclosure.

FIG. 12 is a flowchart illustrating an example of how to process a VPS according to the techniques of this disclosure. The techniques of FIG. 12 will be described with reference to a generic video processing device. The video processing device may correspond to a network device such as MANE 29 of FIG. 1 or one of routing devices 154 in FIG. 6. The video processing device may additionally correspond to a video decoder such as video decoder 30 of FIGS. 1 and 4. The video processing device receives in a video parameter set, one or more syntax elements that include information related to HRD parameters (221). The video processing device receives in the video data a first sequence parameter set comprising a first syntax element identifying the video parameter set (222). The first sequence parameter set comprises a first syntax structure that includes a first group of syntax elements that apply to one or more whole pictures of the video data. The video processing device receives in the video data a second sequence parameter set comprising a second syntax element identifying the video parameter set (223). The second sequence parameter set comprises a second syntax structure that includes a second group of syntax elements that apply to one or more different whole pictures of the video data. The video processing device processes, based on the one or more syntax elements, a first set of video blocks associated with the first parameter set and a second set of video blocks associated with the second parameter set (224).

Figure 13:
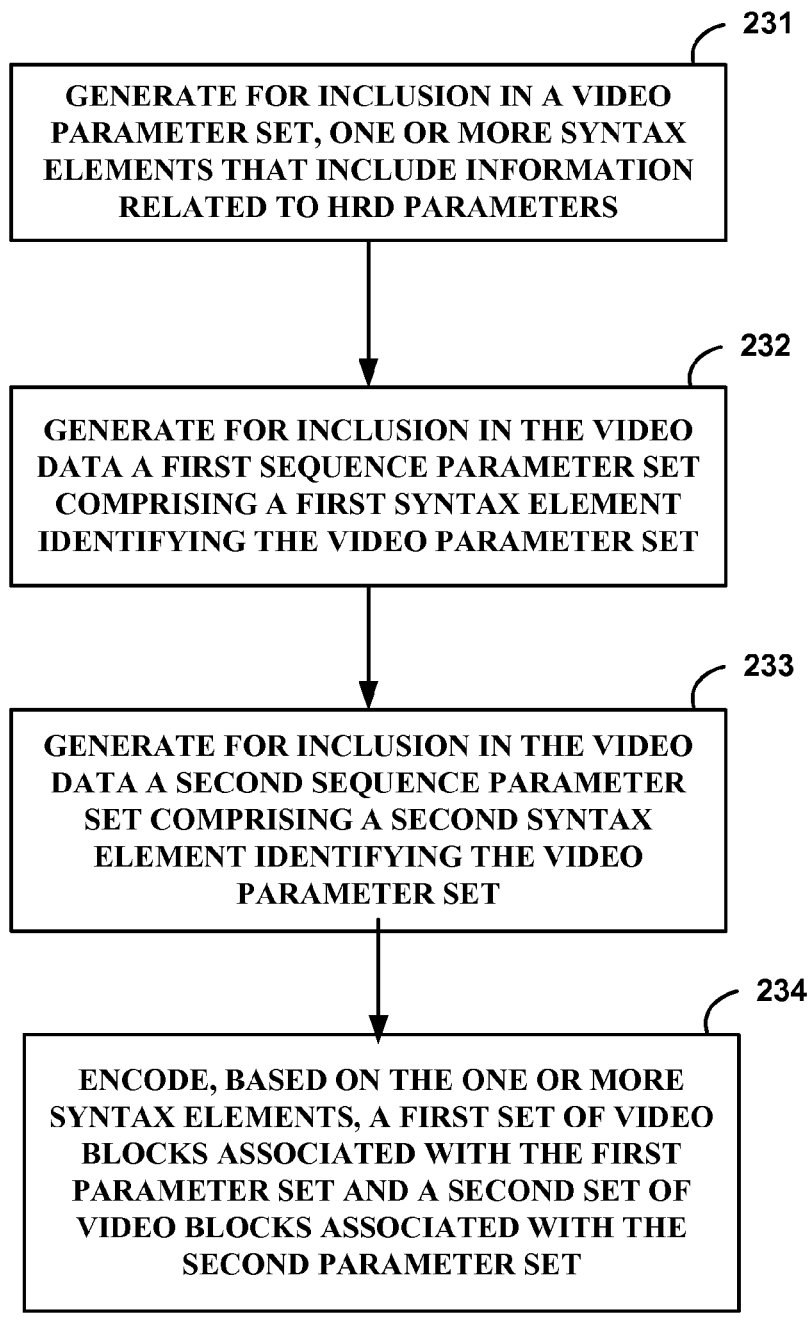
FIG. 13 is a flowchart showing an example method for generating a parameter set in accordance with the techniques of this disclosure.

FIG. 13 is a flowchart illustrating an example of how to generate syntax elements for inclusion in a VPS according to the techniques of this disclosure. The techniques of FIG. 13 will be described with reference to a video processing device configured to encode video data or process encoded video data. Examples of video processing devices configured to process encoded video data in include video encoder 20 of FIGS. 1 and 4 and post processing device 57 of FIG. 4. The video processing device generates for inclusion in a video parameter set, one or more syntax elements that include information related to HRD parameters (231). The video processing device generates for inclusion in the video data a first sequence parameter set comprising a first syntax element identifying the video parameter set (232). The first sequence parameter set comprises a first syntax structure that includes a first group of syntax elements that apply to one or more whole pictures of the video data. The video processing device generates for inclusion in the video data a second sequence parameter set comprising a second syntax element identifying the video parameter set (233). The second sequence parameter set comprises a second syntax structure that includes a second group of syntax elements that apply to one or more different whole pictures of the video data. The video processing device encodes, based on the one or more syntax elements, a first set of video blocks associated with the first parameter set and a second set of video blocks associated with the second parameter set (234).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   receiving, in a video parameter set (VPS) for the video data, one or more syntax elements that include information related to session negotiation, wherein the one or more syntax elements comprise a first syntax element and a second syntax element, wherein the first syntax element identifies a context for interpreting the second syntax element, and wherein the second syntax element identifies at least one profile from among a group of profiles;
   receiving, in the video data, a first sequence parameter set (SPS) comprising a third syntax element identifying the VPS;
   receiving, in the video data, a second SPS comprising a fourth syntax element identifying the VPS;
   receiving, in the VPS, one or more compatibility flags, wherein each of the one or more compatibility flags is associated with a profile from the group of profiles, and wherein a value for each of the one or more compatibility flags identifies if the video data is compatible with an associated profile from the group of profiles;
   decoding, based on the one or more syntax elements, a first set of video blocks associated with the first SPS and a second set of video blocks associated with the second SPS; and
   outputting decoded video data comprising the decoded first set of video block and the decoded second set of video blocks.

2. The method of claim 1, wherein the first SPS comprises a first syntax structure comprising a first group of syntax elements that apply to one or more whole pictures of the video data, and wherein the second SPS comprises a second syntax structure comprising a second group of syntax elements that apply to one or more different whole pictures of the video data.

3. The method of claim 1, wherein the one or more syntax elements comprise one or more fixed length syntax elements.

4. The method of claim 1, wherein the one or more syntax elements precede, in the VPS, any variable length coded syntax elements.

5. The method of claim 1, wherein the one or more syntax elements comprise a syntax element identifying a profile of a video coding standard.

6. The method of claim 5, wherein the one or more syntax elements further comprise a syntax element identifying a level of the video coding standard, wherein the level comprises one of multiple levels associated with the profile of the video coding standard.

7. The method of claim 1, further comprising:
determining a maximum temporal level associated with the video data, and wherein the one or more syntax elements comprise a fifth syntax element that identifies if a temporal layer of the video data has a level that is lower than the maximum temporal level.

8. The method of claim 7, further comprising:
in response to the fifth syntax element indicating a temporal layer of the video data has a level that is lower than the maximum temporal level, receiving additional syntax elements, wherein the additional syntax elements identify levels for one or more temporal layers of the video data.

9. The method of claim 1, wherein the method is performed by a video decoder.

10. A method of encoding video data, the method comprising:
generating, for inclusion in a video parameter set (VPS) for the video data, one or more syntax elements that include information related to session negotiation, wherein the one or more syntax elements comprise a first syntax element and a second syntax element, wherein the first syntax element identifies a context for interpreting the second syntax element, and wherein the second syntax element identifies at least one profile from among a group of profiles;
generating, for inclusion in the video data, a first sequence parameter set (SPS) comprising a third syntax element identifying the VPS;
generating, for inclusion in the video data, a second SPS comprising a fourth syntax element identifying the VPS;
generating, for inclusion in the VPS, one or more compatibility flags, wherein each of the one or more compatibility flags is associated with a profile from the group of profiles, and wherein a value for each of the one or more compatibility flags identifies if the video data is compatible with an associated profile from the group of profiles;
encoding, based on the one or more syntax elements, a first set of video blocks associated with the first SPS and a second set of video blocks associated with the second SPS; and
outputting encoded video data comprising the encoded first set of video block and the encoded second set of video blocks.

11. The method of claim 10, wherein the first SPS comprises a first syntax structure comprising a first group of syntax elements that apply to one or more whole pictures of the video data, and wherein the second SPS comprises a second syntax structure comprising a second group of syntax elements that apply to one or more different whole pictures of the video data.

12. The method of claim 10, wherein the one or more syntax elements comprise one or more fixed length syntax elements.

13. The method of claim 10, wherein the one or more syntax elements precede, in the VPS, any variable length coded syntax elements.

14. The method of claim 10, wherein the one or more syntax elements comprise a syntax element identifying a profile of a video coding standard.

15. The method of claim 14, wherein the one or more syntax elements further comprise a syntax element identifying a level of the video coding standard, wherein the level comprises one of multiple levels associated with the profile of the video coding standard.

16. The method of claim 10, further comprising:
generating, for inclusion in the video data, information indicative of a maximum temporal level associated with the video data, and wherein the one or more syntax elements comprise a fifth syntax element that identifies if a temporal layer of the video data has a level that is lower than the maximum temporal level.

17. The method of claim 16, further comprising:
in response to the fifth syntax element indicating a temporal layer of the video data has a level that is lower than the maximum temporal level, generating additional syntax elements, wherein the additional syntax elements identify levels for one or more temporal layers of the video data.

18. A device for processing video data, the device comprising:
a memory for storing the video data; and
one or more processors configured to:
receive, in a video parameter set (VPS) for the video data, one or more syntax elements that include information related to session negotiation, wherein the one or more syntax elements comprise a first syntax element and a second syntax element, wherein the first syntax element identifies a context for interpreting the second syntax element, and wherein the second syntax element identifies at least one profile from among a group of profiles;
receive, in the video data, a first sequence parameter set (SPS) comprising a third syntax element identifying the VPS;
receive, in the video data, a second SPS comprising a fourth syntax element identifying the VPS;
receive, in the VPS, one or more compatibility flags, wherein each of the one or more compatibility flags is associated with a profile from the group of profiles, and wherein a value for each of the one or more compatibility flags identifies if the video data is compatible with an associated profile from the group of profiles;
decode, based on the one or more syntax elements, a first set of video blocks associated with the first SPS and a second set of video blocks associated with the second SPS; and
output decoded video data comprising the decoded first set of video block and the decoded second set of video blocks.

19. The device of claim 18, wherein the first SPS comprises a first syntax structure comprising a first group of syntax elements that apply to one or more whole pictures of the video data, and wherein the second SPS comprises a second syntax structure comprising a second group of syntax elements that apply to one or more different whole pictures of the video data.

20. The device of claim 18, wherein the one or more syntax elements comprise fixed one or more length syntax elements.

21. The device of claim 18, wherein the one or more syntax elements precede, in the VPS, any variable length coded syntax elements.

22. The device of claim 18, wherein the one or more syntax elements comprise a syntax element identifying a profile of a video coding standard.

23. The device of claim 22, wherein the one or more syntax elements further comprise a syntax element identifying a level of the video coding standard, wherein the level comprises one of multiple levels associated with the profile of the video coding standard.

24. The device of claim 18, wherein the one or more processors are further configured to:
determine a maximum temporal level associated with the video data, and wherein a the one or more syntax elements comprise a fifth syntax element that identifies if a temporal layer of the video data has a level that is lower than the maximum temporal level.

25. The device of claim 24, wherein the one or more processors are further configured to receive additional syntax elements in response to the fifth syntax element indicating a temporal layer of the video data has a level that is lower than the maximum temporal level, wherein the additional syntax elements identify levels for one or more temporal layers of the video data.

26. The device of claim 18, wherein the one or more processors comprises a video decoder.

27. The device of claim 18, wherein the device comprises at least one of:
an integrated circuit;
a microprocessor; or
a wireless communication device that comprises a video decoder.

28. A device for processing video data, the device comprising:
a memory for storing the video data; and
one or more processors configured to:
generate, for inclusion in a video parameter set (VPS) for the video data, one or more syntax elements that include information related to session negotiation, wherein the one or more syntax elements comprise a first syntax element and a second syntax element, wherein the first syntax element identifies a context for interpreting the second syntax element, and wherein the second syntax element identifies at least one profile from among a group of profiles;
generate, for inclusion in the video data, a first sequence parameter set (SPS) comprising a third syntax element identifying the VPS;
generate, for inclusion in the video data, a second SPS comprising a fourth syntax element identifying the VPS;
generate, for inclusion in the VPS, one or more compatibility flags, wherein each of the one or more compatibility flags is associated with a profile from the group of profiles, and wherein a value for each of the one or more compatibility flags identifies if the video data is compatible with an associated profile from the group of profiles;
encode, based on the one or more syntax elements, a first set of video blocks associated with the first SPS and a second set of video blocks associated with the second SPS; and
output encoded video data comprising the encoded first set of video block and the encoded second set of video blocks.

29. The device of claim 28, wherein the first SPS comprises a first syntax structure comprising a first group of syntax elements that apply to one or more whole pictures of the video data, and wherein the second SPS comprises a second syntax structure comprising a second group of syntax elements that apply to one or more different whole pictures of the video data.

30. The device of claim 28, wherein the one or more syntax elements comprise one or more fixed length syntax elements.

31. The device of claim 28, wherein the one or more syntax elements precede, in the VPS, any variable length coded syntax elements.

32. The device of claim 28, wherein the one or more syntax elements comprise a syntax element identifying a profile of a video coding standard.

33. The device of claim 32, wherein the one or more syntax elements further comprise a syntax element identifying a level of the video coding standard, wherein the level comprises one of multiple levels associated with the profile of the video coding standard.

34. The device of claim 28, wherein the one or more processors are further configured to:
generate, for inclusion in the video data, information indicative of a maximum temporal level associated with the video data, and wherein a the one or more syntax elements comprise a fifth syntax element that identifies if a temporal layer of the video data has a level that is lower than the maximum temporal level.

35. The device of claim 34, wherein the one or more processors are further configured to generate additional syntax elements in response to the fifth syntax element indicating a temporal layer of the video data has a level that is lower than the maximum temporal level, wherein the additional syntax elements identify levels for one or more temporal layers of the video data.

36. The device of claim 28, wherein the device comprises at least one of:
an integrated circuit;
a microprocessor; or
a wireless communication device that comprises a video decoder.

37. A device for processing video data, the device comprising:
means for receiving, in a video parameter set (VPS) for the video data, one or more syntax elements that include information related to session negotiation, wherein the one or more syntax elements comprise a first syntax element and a second syntax element, wherein the first syntax element identifies a context for interpreting the second syntax element, and wherein the second syntax element identifies at least one profile from among a group of profiles;
means for receiving, in the video data, a first sequence parameter set (SPS) comprising a third syntax element identifying the VPS;
means for receiving, in the video data, a second SPS comprising a fourth syntax element identifying the VPS;
means for receiving, in the VPS, one or more compatibility flags, wherein each of the one or more compatibility flags is associated with a profile from the group of profiles, and wherein a value for each of the one or more compatibility flags identifies if the video data is compatible with an associated profile from the group of profiles;
means for decoding, based on the one or more syntax elements, a first set of video blocks associated with the first SPS and a second set of video blocks associated with the second SPS; and
means for outputting decoded video data comprising the decoded first set of video block and the decoded second set of video blocks.

38. The device of claim 37, wherein the first SPS comprises a first syntax structure comprising a first group of syntax elements that apply to one or more whole pictures of the video data, and wherein the second SPS comprises a second syntax structure comprising a second group of syntax elements that apply to one or more different whole pictures of the video data.

39. The device of claim 37, wherein the one or more syntax elements comprise one or more fixed length syntax elements.

40. The device of claim 37, wherein the one or more syntax elements precede, in the VPS, any variable length coded syntax elements.

41. The device of claim 37, wherein the one or more syntax elements comprise a syntax element identifying a profile of a video coding standard.

42. The device of claim 41, wherein the one or more syntax elements further comprise a syntax element identifying a level of the video coding standard, wherein the level comprises one of multiple levels associated with the profile of the video coding standard.

43. The device of claim 37, further comprising:
determine a maximum temporal level associated with the video data, and wherein a the one or more syntax elements comprise a fifth syntax element that identifies if a temporal layer of the video data has a level that is lower than the maximum temporal level.

44. The device of claim 43, further comprising:
means for receiving additional syntax elements in response to the fifth syntax element indicating a temporal layer of the video data has a level that is lower than the maximum temporal level, wherein the additional syntax elements identify levels for one or more temporal layers of the video data.

45. A non-transitory computer-readable storage medium storing instructions that when executed cause one or more processors to:
receive, in a video parameter set (VPS) for the video data, one or more syntax elements that include information related to session negotiation, wherein the one or more syntax elements comprise a first syntax element and a second syntax element, wherein the first syntax element identifies a context for interpreting the second syntax element, and wherein the second syntax element identifies at least one profile from among a group of profiles;
receive, in the video data, a first sequence parameter set (SPS) comprising a third syntax element identifying the VPS;
receive, in the video data, a second SPS comprising a fourth syntax element identifying the VPS;
receive, in the VPS, one or more compatibility flags, wherein each of the one or more compatibility flags is associated with a profile from the group of profiles, and wherein a value for each of the one or more compatibility flags identifies if the video data is compatible with an associated profile from the group of profiles;
decode, based on the one or more syntax elements, a first set of video blocks associated with the first SPS and a second set of video blocks associated with the second SPS; and
output decoded video data comprising the decoded first set of video block and the decoded second set of video blocks.

46. The non-transitory computer-readable storage medium of claim 45, wherein the first SPS comprises a first syntax structure comprising a first group of syntax elements that apply to one or more whole pictures of the video data, and wherein the SPS comprises a second syntax structure comprising a second group of syntax elements that apply to one or more different whole pictures of the video data.

47. The non-transitory computer-readable storage medium of claim 45, wherein the one or more syntax elements comprise one or more fixed length syntax elements.

48. The non-transitory computer-readable storage medium of claim 45, wherein the one or more syntax elements precede, in the VPS, any variable length coded syntax elements.

49. The non-transitory computer-readable storage medium of claim 45, wherein the one or more syntax elements comprise a syntax element identifying a profile of a video coding standard.

50. The non-transitory computer-readable storage medium of claim 49, wherein the one or more syntax elements further comprise a syntax element identifying a level of the video coding standard, wherein the level comprises one of multiple levels associated with the profile of the video coding standard.

51. The non-transitory computer-readable storage medium of claim 45, storing further instructions that when executed cause the one or more processors to:
determine a maximum temporal level associated with the video data, and wherein the one or more syntax elements comprise a fifth syntax element that identifies if a temporal layer of the video data has a level that is lower than the maximum temporal level.

52. The non-transitory computer-readable storage medium of claim 51, storing further instructions that when executed cause the one or more processors to:
receive additional syntax elements in response to the fifth syntax element indicating a temporal layer of the video data has a level that is lower than the maximum temporal level, wherein the additional syntax elements identify levels for one or more temporal layers of the video data.

* * * * *